(12) United States Patent
Burman et al.

(10) Patent No.: US 9,306,952 B2
(45) Date of Patent: Apr. 5, 2016

(54) SYSTEM AND METHOD FOR WIRELESS GAMING WITH LOCATION DETERMINATION

(75) Inventors: Kevin Burman, Hunters Hill (AU); Dean P. Alderucci, Westport, CT (US)

(73) Assignee: CFPH, LLC, New York, NY (US)

(*) Notice: Subject to any disclaimer, the term of this patent is extended or adjusted under 35 U.S.C. 154(b) by 1465 days.

(21) Appl. No.: 11/553,130

(22) Filed: Oct. 26, 2006

(65) Prior Publication Data
US 2008/0102956 A1     May 1, 2008

(51) Int. Cl.
*A63F 9/24* (2006.01)
*H04L 29/06* (2006.01)
*G06Q 20/32* (2012.01)
*G07F 17/32* (2006.01)
*H04W 4/00* (2009.01)
*H04W 4/02* (2009.01)

(52) U.S. Cl.
CPC .......... *H04L 63/104* (2013.01); *G06Q 20/3224* (2013.01); *G07F 17/32* (2013.01); *G07F 17/3223* (2013.01); *H04L 63/107* (2013.01); *H04W 4/001* (2013.01); *H04W 4/02* (2013.01); *H04W 4/021* (2013.01)

(58) Field of Classification Search
CPC . G07F 17/3244; G07F 17/32; G07F 17/3241; A63F 13/00; A63F 13/06; A63F 13/05
USPC .................. 463/13, 16–20, 30, 37, 39, 40, 42
See application file for complete search history.

(56) References Cited

U.S. PATENT DOCUMENTS

| | | |
|---|---|---|
| 3,580,581 A | 5/1971 | Raven |
| 3,838,259 A | 9/1974 | Kortenhaus |
| 3,876,208 A | 4/1975 | Wachtler et al. |

(Continued)

FOREIGN PATENT DOCUMENTS

| | | |
|---|---|---|
| DE | 19922862 | 12/2000 |
| DE | 19944140 | 3/2001 |

(Continued)

OTHER PUBLICATIONS

U.S. Appl. No. 10/835,995 entitled *System and Method for a Convenience Gaming* by Lee M. Amaitis, et al., filed Apr. 29, 2004.

(Continued)

*Primary Examiner* — Steve Rowland
(74) *Attorney, Agent, or Firm* — Thomas D. Bradshaw

(57) ABSTRACT

In accordance with the teachings of the present embodiment, a system and method for wireless gaming with location-dependent gaming functions are provided. In a particular embodiment, the apparatus includes a gaming server; a wireless network at least partially covering a property, the wireless network comprising a plurality of signal detection devices; and a gaming communication device operable to transmit and receive gaming information to and from the gaming server via the wireless network. A location of the gaming communication device on the property is used to alter a game play function, such as a bet option, wager, graphic overlay, permission, or to provide location-dependent advertising or embedded advertising. Based upon the location of the gaming communication device on the property, a predetermined functionality of the gaming communication device may be enabled and/or controlled.

30 Claims, 5 Drawing Sheets

(56) References Cited

U.S. PATENT DOCUMENTS

| | | |
|---|---|---|
| 3,929,338 A | 12/1975 | Busch |
| 4,101,129 A | 7/1978 | Cox |
| 4,157,829 A | 6/1979 | Goldman et al. |
| 4,206,920 A | 6/1980 | Weatherford et al. |
| 4,216,965 A | 8/1980 | Morrison et al. |
| 4,238,127 A | 12/1980 | Lucero et al. |
| 4,240,635 A | 12/1980 | Brown |
| 4,266,214 A | 5/1981 | Peters, Jr. |
| 4,335,809 A | 6/1982 | Wain |
| 4,448,419 A | 5/1984 | Telnaes |
| 4,467,424 A | 8/1984 | Hedges et al. |
| 4,492,379 A | 1/1985 | Okada |
| 4,527,798 A | 7/1985 | Siekierski et al. |
| 4,572,509 A | 2/1986 | Sitrick |
| 4,573,681 A | 3/1986 | Okada |
| 4,614,342 A | 9/1986 | Takashima |
| 4,624,459 A | 11/1986 | Kaufman |
| 4,636,951 A | 1/1987 | Harlick |
| 4,648,600 A | 3/1987 | Olliges |
| 4,652,998 A | 3/1987 | Koza et al. |
| 4,692,863 A | 9/1987 | Moosz |
| 4,760,527 A | 7/1988 | Sidley |
| 4,805,907 A | 2/1989 | Hagiwara |
| 4,817,951 A | 4/1989 | Crouch et al. |
| 4,838,552 A | 6/1989 | Hagiwara |
| 4,853,884 A | 8/1989 | Brown et al. |
| 4,856,787 A | 8/1989 | Itkis |
| 4,858,932 A | 8/1989 | Keane |
| 4,880,237 A | 11/1989 | Kishishita |
| 4,909,516 A | 3/1990 | Kolinsky |
| 4,926,327 A | 5/1990 | Sidley |
| 4,959,783 A | 9/1990 | Scott et al. |
| 4,964,638 A | 10/1990 | Ishida |
| 5,007,087 A | 4/1991 | Bernstein et al. |
| 5,024,441 A | 6/1991 | Rousseau |
| 5,048,833 A | 9/1991 | Lamle |
| 5,050,881 A | 9/1991 | Nagao |
| 5,056,141 A | 10/1991 | Dyke |
| 5,074,559 A | 12/1991 | Okada |
| 5,083,785 A | 1/1992 | Okada |
| 5,096,195 A | 3/1992 | Gimmon |
| 5,096,202 A | 3/1992 | Hesland |
| 5,102,134 A | 4/1992 | Smyth |
| 5,192,076 A | 3/1993 | Komori |
| 5,229,764 A | 7/1993 | Matchett et al. |
| 5,242,163 A | 9/1993 | Fulton |
| 5,251,165 A | 10/1993 | James, III |
| 5,251,898 A | 10/1993 | Dickenson et al. |
| 5,263,716 A | 11/1993 | Smyth |
| 5,265,874 A | 11/1993 | Dickinson et al. |
| 5,280,426 A | 1/1994 | Edmonds |
| 5,280,909 A | 1/1994 | Tracy |
| 5,324,035 A | 6/1994 | Morris et al. |
| 5,326,104 A | 7/1994 | Pease et al. |
| 5,344,199 A | 9/1994 | Carstens et al. |
| 5,351,970 A | 10/1994 | Fioretti |
| 5,370,306 A | 12/1994 | Schulze et al. |
| 5,380,007 A | 1/1995 | Travis et al. |
| 5,380,008 A | 1/1995 | Mathis et al. |
| 5,393,061 A | 2/1995 | Manship et al. |
| 5,398,932 A | 3/1995 | Eberhardt et al. |
| 5,415,416 A | 5/1995 | Scagnelli et al. |
| 5,421,576 A | 6/1995 | Yamazaki et al. |
| 5,429,361 A | 7/1995 | Raven et al. |
| 5,476,259 A | 12/1995 | Weingardt |
| 5,505,449 A | 4/1996 | Eberhardt et al. |
| 5,507,485 A | 4/1996 | Fisher |
| 5,511,784 A | 4/1996 | Furry et al. |
| 5,524,888 A | 6/1996 | Heidel |
| 5,551,692 A | 9/1996 | Pettit et al. |
| 5,569,083 A | 10/1996 | Fioretti |
| 5,569,084 A | 10/1996 | Nicastro et al. |
| 5,580,309 A | 12/1996 | Piechowiak et al. |
| 5,586,937 A | 12/1996 | Menashe |
| 5,588,913 A | 12/1996 | Hecht |
| 5,613,912 A | 3/1997 | Slater |
| 5,618,232 A | 4/1997 | Martin |
| 5,653,634 A | 8/1997 | Hodges |
| 5,654,746 A | 8/1997 | McMullan, Jr. et al. |
| 5,655,961 A | 8/1997 | Acres et al. |
| 5,675,828 A | 10/1997 | Stoel et al. |
| 5,697,844 A | 12/1997 | Von Kohorn |
| 5,702,302 A | 12/1997 | Gauselman |
| 5,707,286 A | 1/1998 | Carlson |
| 5,738,583 A | 4/1998 | Comas et al. |
| 5,762,552 A | 6/1998 | Vuong et al. |
| 5,764,789 A | 6/1998 | Pare, Jr. et al. |
| 5,766,076 A | 6/1998 | Pease et al. |
| 5,768,382 A | 6/1998 | Schneier et al. |
| 5,785,595 A | 7/1998 | Gauselman |
| 5,816,920 A | 10/1998 | Hanai |
| 5,833,536 A | 11/1998 | Davids et al. |
| 5,836,817 A | 11/1998 | Acres et al. |
| 5,851,148 A | 12/1998 | Brune et al. |
| 5,857,911 A | 1/1999 | Fioretti |
| 5,871,398 A | 2/1999 | Schneier et al. |
| 5,878,211 A | 3/1999 | Delagrange |
| 5,889,474 A | 3/1999 | LaDue |
| 5,902,983 A | 5/1999 | Crevelt et al. |
| 5,904,619 A | 5/1999 | Scagnelli et al. |
| 5,904,620 A | 5/1999 | Kujawa |
| 5,910,047 A | 6/1999 | Scagnelli et al. |
| 5,920,640 A | 7/1999 | Salatino et al. |
| 5,921,865 A | 7/1999 | Scagnelli |
| 5,935,005 A | 8/1999 | Tsuda et al. |
| 5,951,397 A | 9/1999 | Dickinson |
| 5,954,583 A | 9/1999 | Green |
| 5,959,596 A | 9/1999 | McCarten et al. |
| 5,970,143 A | 10/1999 | Schneier et al. |
| 5,977,957 A | 11/1999 | Miller et al. |
| 5,991,431 A | 11/1999 | Borza et al. |
| 5,995,630 A | 11/1999 | Borza et al. |
| 5,999,808 A | 12/1999 | LaDue |
| 6,001,016 A | 12/1999 | Walker et al. |
| 6,003,013 A | 12/1999 | Boushy et al. |
| 6,012,636 A | 1/2000 | Smith |
| 6,012,982 A | 1/2000 | Piechowiak et al. |
| 6,027,115 A | 2/2000 | Griswold et al. |
| 6,048,269 A | 4/2000 | Burns et al. |
| 6,050,622 A | 4/2000 | Gustafson |
| 6,098,985 A | 8/2000 | Moody |
| 6,099,408 A | 8/2000 | Schneier et al. |
| 6,100,804 A | 8/2000 | Brady et al. |
| 6,104,815 A | 8/2000 | Alcorn |
| 6,135,884 A | 10/2000 | Hedrick et al. |
| 6,146,270 A | 11/2000 | Huard et al. |
| 6,148,094 A | 11/2000 | Kinsella |
| 6,177,905 B1 | 1/2001 | Welch |
| 6,178,255 B1 | 1/2001 | Scott et al. |
| 6,178,510 B1 | 1/2001 | O'Connoe et al. |
| 6,183,366 B1 | 2/2001 | Goldberg et al. |
| 6,193,153 B1 | 2/2001 | Lambert |
| 6,196,920 B1 | 3/2001 | Spaur et al. |
| 6,210,274 B1 | 4/2001 | Carlson |
| 6,219,439 B1 | 4/2001 | Burger |
| 6,233,448 B1 | 5/2001 | Alperovich et al. |
| 6,248,017 B1 | 6/2001 | Roach |
| 6,251,014 B1 | 6/2001 | Stockdale et al. |
| 6,251,017 B1 | 6/2001 | Leason et al. |
| 6,264,560 B1 | 7/2001 | Goldberg et al. |
| 6,272,223 B1 | 8/2001 | Carlson |
| 6,277,026 B1 | 8/2001 | Archer |
| 6,277,029 B1 | 8/2001 | Hanley |
| 6,280,325 B1 | 8/2001 | Fisk |
| 6,287,202 B1 | 9/2001 | Pascal et al. |
| 6,290,601 B1 | 9/2001 | Yamazaki et al. |
| RE37,414 E | 10/2001 | Harlick |
| 6,309,307 B1 | 10/2001 | Krause et al. |
| 6,320,495 B1 | 11/2001 | Sporgis |
| 6,325,285 B1 | 12/2001 | Baratelli |
| 6,325,292 B1 | 12/2001 | Sehr |
| 6,331,148 B1 | 12/2001 | Krause et al. |
| 6,386,976 B1 | 5/2002 | Yamazaki et al. |
| 6,409,602 B1 | 6/2002 | Wiltshire et al. |

(56) References Cited

U.S. PATENT DOCUMENTS

| | | |
|---|---|---|
| 6,425,828 B2 | 7/2002 | Walker et al. |
| 6,428,413 B1 | 8/2002 | Carlson |
| 6,441,752 B1 | 8/2002 | Fomukong |
| RE37,885 E | 10/2002 | Acres et al. |
| 6,468,155 B1 | 10/2002 | Zucker |
| 6,507,279 B2 | 1/2003 | Loof |
| 6,508,709 B1 | 1/2003 | Karmarkar |
| 6,508,710 B1 | 1/2003 | Paravia et al. |
| 6,509,217 B1 | 1/2003 | Reddy |
| 6,520,853 B2 | 2/2003 | Suzuki |
| 6,524,189 B1 | 2/2003 | Rautila |
| 6,527,641 B1 | 3/2003 | Sinclair et al. |
| 6,542,750 B2 | 4/2003 | Hendrey et al. |
| 6,554,705 B1 | 4/2003 | Cumbers |
| 6,554,707 B1 | 4/2003 | Sinclair |
| 6,556,819 B2 | 4/2003 | Irvin |
| 6,575,834 B1 | 6/2003 | Lindo |
| 6,577,733 B1 | 6/2003 | Charrin |
| 6,582,302 B2 | 6/2003 | Romero |
| 6,585,597 B2 | 7/2003 | Finn |
| 6,612,928 B1 | 9/2003 | Bradford et al. |
| 6,614,350 B1 | 9/2003 | Lunsford |
| 6,618,706 B1 | 9/2003 | Rive et al. |
| 6,622,157 B1 | 9/2003 | Heddaya et al. |
| 6,628,939 B2 | 9/2003 | Paulsen |
| 6,634,942 B2 | 10/2003 | Walker |
| 6,676,522 B2 | 1/2004 | Rowe et al. |
| 6,680,675 B1 | 1/2004 | Suzuki |
| 6,682,421 B1 | 1/2004 | Rowe et al. |
| 6,691,032 B1 | 2/2004 | Irish et al. |
| 6,709,333 B1 | 3/2004 | Bradford et al. |
| 6,719,631 B1 | 4/2004 | Tulley et al. |
| 6,729,956 B2 | 5/2004 | Wolf et al. |
| 6,743,098 B2 | 6/2004 | Urie et al. |
| 6,745,011 B1 | 6/2004 | Hendrickson |
| 6,749,505 B1 | 6/2004 | Kunzle |
| 6,754,210 B1 | 6/2004 | Ofek |
| 6,755,742 B1 | 6/2004 | Hartman |
| 6,756,882 B2 | 6/2004 | Benes |
| 6,761,638 B1 * | 7/2004 | Narita ............................ 463/43 |
| 6,773,350 B2 | 8/2004 | Yoshimi et al. |
| 6,778,820 B2 | 8/2004 | Tendler |
| 6,793,580 B2 | 9/2004 | Sinclair |
| 6,800,029 B2 | 10/2004 | Rowe et al. |
| 6,800,031 B2 | 10/2004 | Di Cesare |
| 6,801,934 B1 | 10/2004 | Eranko |
| 6,802,772 B1 | 10/2004 | Kunzle |
| 6,834,195 B2 | 12/2004 | Brandenberg et al. |
| 6,837,789 B2 | 1/2005 | Garahi et al. |
| 6,843,412 B1 | 1/2005 | Sanford |
| 6,843,725 B2 | 1/2005 | Nelson |
| 6,846,238 B2 * | 1/2005 | Wells ............................ 463/39 |
| 6,857,959 B1 | 2/2005 | Nguyen |
| 6,863,610 B2 | 3/2005 | Vancraeynest |
| 6,868,396 B2 | 3/2005 | Smith et al. |
| 6,884,162 B2 | 4/2005 | Raverdy |
| 6,884,166 B2 | 4/2005 | Leen et al. |
| 6,887,151 B2 | 5/2005 | Leen et al. |
| 6,887,159 B2 | 5/2005 | Leen et al. |
| 6,892,218 B2 | 5/2005 | Heddaya et al. |
| 6,892,938 B2 | 5/2005 | Solomon |
| 6,893,347 B1 | 5/2005 | Zilliacus |
| 6,896,618 B2 | 5/2005 | Benoy et al. |
| 6,898,299 B1 | 5/2005 | Brooks |
| 6,899,628 B2 | 5/2005 | Leen et al. |
| 6,904,520 B1 | 6/2005 | Rosset |
| 6,908,387 B2 | 6/2005 | Hedrick et al. |
| 6,908,391 B2 | 6/2005 | Gatto et al. |
| 6,923,724 B2 | 8/2005 | Williams |
| 6,935,952 B2 | 8/2005 | Walker et al. |
| 6,935,958 B2 | 8/2005 | Nelson |
| 6,942,574 B1 | 9/2005 | Lemay et al. |
| 6,945,870 B2 | 9/2005 | Gatto et al. |
| RE38,812 E | 10/2005 | Acres et al. |
| 6,966,832 B2 | 11/2005 | Leen et al. |
| 6,979,264 B2 | 12/2005 | Chatigny et al. |
| 6,979,267 B2 | 12/2005 | Leen et al. |
| 6,984,175 B2 | 1/2006 | Nguyen et al. |
| 6,986,055 B2 | 1/2006 | Carlson |
| 6,997,810 B2 | 2/2006 | Cole |
| 7,021,623 B2 | 4/2006 | Leen et al. |
| 7,022,017 B1 | 4/2006 | Halbritter et al. |
| 7,029,394 B2 | 4/2006 | Leen et al. |
| 7,033,276 B2 | 4/2006 | Walker et al. |
| 7,035,653 B2 | 4/2006 | Simon et al. |
| 7,040,987 B2 | 5/2006 | Walker et al. |
| 7,042,360 B2 | 5/2006 | Light et al. |
| 7,043,641 B1 | 5/2006 | Martinek et al. |
| 7,081,815 B2 | 7/2006 | Runyon et al. |
| 7,097,562 B2 | 8/2006 | Gagner |
| 7,102,507 B1 | 9/2006 | Lauren |
| 7,102,509 B1 | 9/2006 | Anders et al. |
| 7,124,947 B2 | 10/2006 | Storch |
| 7,125,334 B2 | 10/2006 | Yamazaki et al. |
| 7,144,011 B2 | 12/2006 | Asher et al. |
| 7,147,558 B2 | 12/2006 | Giobbi |
| 7,158,798 B2 | 1/2007 | Lee et al. |
| 7,207,885 B2 | 4/2007 | Longman |
| 7,229,354 B2 | 6/2007 | McNutt et al. |
| 7,233,922 B2 | 6/2007 | Asher et al. |
| 7,248,852 B2 | 7/2007 | Cabrera et al. |
| 7,270,605 B2 | 9/2007 | Russell et al. |
| 7,288,025 B1 | 10/2007 | Cumbers |
| 7,290,264 B1 | 10/2007 | Powers et al. |
| 7,297,062 B2 | 11/2007 | Gatto et al. |
| 7,306,514 B2 | 12/2007 | Amaitis et al. |
| 7,311,606 B2 | 12/2007 | Amaitis et al. |
| 7,316,619 B2 | 1/2008 | Nelson |
| 7,341,517 B2 | 3/2008 | Asher et al. |
| 7,357,717 B1 | 4/2008 | Cumbers |
| 7,394,405 B2 | 7/2008 | Godden |
| 7,413,513 B2 | 8/2008 | Nguyen et al. |
| 7,437,147 B1 | 10/2008 | Luciano, Jr. |
| 7,442,124 B2 | 10/2008 | Asher et al. |
| 7,452,273 B2 | 11/2008 | Amaitis et al. |
| 7,452,274 B2 | 11/2008 | Amaitis et al. |
| 7,458,891 B2 | 12/2008 | Asher et al. |
| 7,506,172 B2 | 3/2009 | Bhakta |
| 7,510,474 B2 | 3/2009 | Carter |
| 7,534,169 B2 | 5/2009 | Amaitis et al. |
| 7,549,756 B2 | 6/2009 | Willis et al. |
| 7,562,034 B2 | 7/2009 | Asher et al. |
| 7,566,270 B2 | 7/2009 | Amaitis et al. |
| 2001/0018663 A1 | 8/2001 | Dussell et al. |
| 2001/0026610 A1 | 10/2001 | Katz et al. |
| 2001/0027130 A1 | 10/2001 | Namba et al. |
| 2001/0028308 A1 | 10/2001 | De La Huerga |
| 2001/0031663 A1 | 10/2001 | Johnson |
| 2001/0036858 A1 | 11/2001 | McNutt et al. |
| 2001/0049275 A1 | 12/2001 | Pierry et al. |
| 2002/0002075 A1 | 1/2002 | Rowe |
| 2002/0013827 A1 | 1/2002 | Edstrom et al. |
| 2002/0034978 A1 | 3/2002 | Legge et al. |
| 2002/0037767 A1 | 3/2002 | Ebin |
| 2002/0049909 A1 | 4/2002 | Jackson et al. |
| 2002/0052231 A1 | 5/2002 | Fioretti |
| 2002/0065097 A1 | 5/2002 | Brockenbrough |
| 2002/0068631 A1 | 6/2002 | Raverdy |
| 2002/0073021 A1 | 6/2002 | Ginsberg et al. |
| 2002/0074725 A1 | 6/2002 | Stern |
| 2002/0095586 A1 | 7/2002 | Doyle et al. |
| 2002/0111210 A1 | 8/2002 | Luciano |
| 2002/0111213 A1 | 8/2002 | McEntee et al. |
| 2002/0119817 A1 | 8/2002 | Behm |
| 2002/0124182 A1 | 9/2002 | Bacso |
| 2002/0125886 A1 | 9/2002 | Bates et al. |
| 2002/0132663 A1 | 9/2002 | Cumbers |
| 2002/0142844 A1 | 10/2002 | Kerr |
| 2002/0142846 A1 | 10/2002 | Paulsen |
| 2002/0143960 A1 | 10/2002 | Goren |
| 2002/0143991 A1 | 10/2002 | Chow et al. |
| 2002/0147047 A1 | 10/2002 | Letovsky |
| 2002/0147049 A1 | 10/2002 | Carter, Sr. |
| 2002/0151344 A1 | 10/2002 | Tanskanen |

(56) References Cited

U.S. PATENT DOCUMENTS

| | | |
|---|---|---|
| 2002/0155884 A1 | 10/2002 | Updike |
| 2002/0160834 A1 | 10/2002 | Urie et al. |
| 2002/0160838 A1 | 10/2002 | Kim |
| 2002/0165020 A1 | 11/2002 | Koyama |
| 2002/0174336 A1 | 11/2002 | Sakakibara et al. |
| 2002/0191017 A1 | 12/2002 | Sinclair |
| 2002/0198044 A1 | 12/2002 | Walker |
| 2003/0003988 A1 | 1/2003 | Walker et al. |
| 2003/0006931 A1 | 1/2003 | Mages |
| 2003/0008662 A1 | 1/2003 | Stern et al. |
| 2003/0009603 A1 | 1/2003 | Ruths et al. |
| 2003/0013438 A1 | 1/2003 | Darby |
| 2003/0014639 A1 | 1/2003 | Jackson et al. |
| 2003/0017871 A1 | 1/2003 | Urie et al. |
| 2003/0028567 A1 | 2/2003 | Carlson |
| 2003/0031321 A1 | 2/2003 | Mages |
| 2003/0032407 A1 | 2/2003 | Mages |
| 2003/0032434 A1 | 2/2003 | Willner et al. |
| 2003/0036428 A1 | 2/2003 | Aasland |
| 2003/0040324 A1 | 2/2003 | Eldering et al. |
| 2003/0045353 A1 | 3/2003 | Paulsen et al. |
| 2003/0045358 A1 | 3/2003 | Leen et al. |
| 2003/0054878 A1 | 3/2003 | Benoy et al. |
| 2003/0060286 A1 | 3/2003 | Walker |
| 2003/0064712 A1 | 4/2003 | Gaston |
| 2003/0064798 A1 | 4/2003 | Grauzer et al. |
| 2003/0064805 A1 | 4/2003 | Wells |
| 2003/0064807 A1 | 4/2003 | Walker et al. |
| 2003/0069071 A1 | 4/2003 | Britt et al. |
| 2003/0069940 A1 | 4/2003 | Kavacheri et al. |
| 2003/0078101 A1 | 4/2003 | Schneider et al. |
| 2003/0087701 A1 | 5/2003 | Paravia et al. |
| 2003/0109306 A1 | 6/2003 | Karmarkar |
| 2003/0109310 A1 | 6/2003 | Heaton et al. |
| 2003/0114218 A1 | 6/2003 | McClintic |
| 2003/0130032 A1 | 7/2003 | Martinek et al. |
| 2003/0139190 A1 | 7/2003 | Steelberg |
| 2003/0140131 A1 | 7/2003 | Chandrashekhar |
| 2003/0148809 A1 | 8/2003 | Nelson |
| 2003/0148812 A1 | 8/2003 | Paulsen et al. |
| 2003/0157976 A1 | 8/2003 | Simon |
| 2003/0162580 A1 | 8/2003 | Cousineau |
| 2003/0162593 A1 | 8/2003 | Griswold et al. |
| 2003/0162594 A1 | 8/2003 | Rowe |
| 2003/0173408 A1 | 9/2003 | Mosher et al. |
| 2003/0176162 A1 | 9/2003 | Planki |
| 2003/0176218 A1 | 9/2003 | Lemay |
| 2003/0177187 A1 | 9/2003 | Levine et al. |
| 2003/0177347 A1 | 9/2003 | Schneier et al. |
| 2003/0195037 A1 | 10/2003 | Voung et al. |
| 2003/0195043 A1 | 10/2003 | Shinners et al. |
| 2003/0195841 A1 | 10/2003 | Ginsberg et al. |
| 2003/0208684 A1 | 11/2003 | Camacho et al. |
| 2003/0228895 A1 | 12/2003 | Edelson |
| 2003/0228898 A1 | 12/2003 | Rowe |
| 2003/0228907 A1 | 12/2003 | Gatto et al. |
| 2003/0228910 A1 | 12/2003 | Jawaharla et al. |
| 2003/0236120 A1 | 12/2003 | Reece |
| 2004/0002355 A1 | 1/2004 | Spencer |
| 2004/0002383 A1 | 1/2004 | Lundy |
| 2004/0002386 A1 | 1/2004 | Wolfe et al. |
| 2004/0002843 A1 | 1/2004 | Robarts |
| 2004/0009812 A1 | 1/2004 | Scott et al. |
| 2004/0029635 A1 | 2/2004 | Giobbi |
| 2004/0034775 A1 | 2/2004 | Desjardins et al. |
| 2004/0038734 A1 | 2/2004 | Adams |
| 2004/0048613 A1 | 3/2004 | Sayers |
| 2004/0053692 A1 | 3/2004 | Chatigny et al. |
| 2004/0063497 A1 | 4/2004 | Gould |
| 2004/0066296 A1 | 4/2004 | Atherton |
| 2004/0068441 A1 | 4/2004 | Werbitt |
| 2004/0068532 A1 | 4/2004 | Dewing |
| 2004/0092306 A1 | 5/2004 | George et al. |
| 2004/0092311 A1 | 5/2004 | Weston |
| 2004/0097283 A1 | 5/2004 | Piper |
| 2004/0097287 A1 | 5/2004 | Postrel |
| 2004/0104274 A1 | 6/2004 | Kotik et al. |
| 2004/0104845 A1 | 6/2004 | McCarthy |
| 2004/0111369 A1 | 6/2004 | Lane et al. |
| 2004/0127277 A1 | 7/2004 | Walker et al. |
| 2004/0127289 A1 | 7/2004 | Davis |
| 2004/0132530 A1 | 7/2004 | Rutanen |
| 2004/0137987 A1 | 7/2004 | Nguyen et al. |
| 2004/0142744 A1 | 7/2004 | Atkinson et al. |
| 2004/0147323 A1 | 7/2004 | Cliff et al. |
| 2004/0162124 A1 | 8/2004 | Barton |
| 2004/0162144 A1 | 8/2004 | Loose |
| 2004/0186768 A1 | 9/2004 | Wakim et al. |
| 2004/0189470 A1 | 9/2004 | Girvin et al. |
| 2004/0192438 A1 | 9/2004 | Wells et al. |
| 2004/0192442 A1 | 9/2004 | Wells et al. |
| 2004/0193469 A1 | 9/2004 | Amaitis et al. |
| 2004/0193531 A1 | 9/2004 | Amaitis et al. |
| 2004/0198386 A1 | 10/2004 | Dupray |
| 2004/0198396 A1 | 10/2004 | Fransioli |
| 2004/0198403 A1 | 10/2004 | Pedersen et al. |
| 2004/0198483 A1 | 10/2004 | Amaitis et al. |
| 2004/0209660 A1 | 10/2004 | Carlson |
| 2004/0209690 A1 | 10/2004 | Bruzzese |
| 2004/0219961 A1 | 11/2004 | Ellenby |
| 2004/0224769 A1 | 11/2004 | Hansen |
| 2004/0225565 A1 | 11/2004 | Selman |
| 2004/0229685 A1 | 11/2004 | Smith |
| 2004/0229699 A1 | 11/2004 | Gentles et al. |
| 2004/0243504 A1 | 12/2004 | Asher et al. |
| 2004/0248637 A1 | 12/2004 | Liebenberg et al. |
| 2004/0248653 A1 | 12/2004 | Barros et al. |
| 2004/0259626 A1 | 12/2004 | Akram |
| 2004/0259631 A1 | 12/2004 | Katz et al. |
| 2004/0266533 A1 | 12/2004 | Gentles et al. |
| 2005/0001711 A1 | 1/2005 | Doughty et al. |
| 2005/0003888 A1 | 1/2005 | Asher et al. |
| 2005/0003893 A1 | 1/2005 | Hogwood et al. |
| 2005/0014554 A1 | 1/2005 | Walker et al. |
| 2005/0020336 A1 | 1/2005 | Cesare |
| 2005/0026670 A1 | 2/2005 | Lardie |
| 2005/0026697 A1 | 2/2005 | Balahura |
| 2005/0027643 A1 | 2/2005 | Amaitis et al. |
| 2005/0043996 A1 | 2/2005 | Silver |
| 2005/0049949 A1 | 3/2005 | Asher et al. |
| 2005/0054439 A1 | 3/2005 | Rowe et al. |
| 2005/0059397 A1 | 3/2005 | Zhao |
| 2005/0059485 A1 | 3/2005 | Paulsen |
| 2005/0064934 A1 | 3/2005 | Amaitis et al. |
| 2005/0086301 A1 | 4/2005 | Eichler et al. |
| 2005/0096109 A1 | 5/2005 | McNutt |
| 2005/0096133 A1 | 5/2005 | Hoefelmeyer et al. |
| 2005/0101383 A1 | 5/2005 | Wells |
| 2005/0107022 A1 | 5/2005 | Wichelmann |
| 2005/0108365 A1 | 5/2005 | Becker et al. |
| 2005/0130728 A1 | 6/2005 | Nguyen |
| 2005/0131815 A1 | 6/2005 | Fung et al. |
| 2005/0137014 A1 | 6/2005 | Vetelainen |
| 2005/0143169 A1 | 6/2005 | Nguyen et al. |
| 2005/0159212 A1 | 7/2005 | Romney et al. |
| 2005/0170886 A1 | 8/2005 | Miller |
| 2005/0170890 A1 | 8/2005 | Rowe et al. |
| 2005/0170892 A1 | 8/2005 | Atkinson |
| 2005/0181859 A1 | 8/2005 | Lind et al. |
| 2005/0181862 A1 | 8/2005 | Asher et al. |
| 2005/0181870 A1 | 8/2005 | Nguyen et al. |
| 2005/0187000 A1 | 8/2005 | Miller |
| 2005/0187020 A1 | 8/2005 | Amaitis et al. |
| 2005/0192077 A1 | 9/2005 | Okuniewicz |
| 2005/0193118 A1 | 9/2005 | Le et al. |
| 2005/0193209 A1 | 9/2005 | Saunders et al. |
| 2005/0197189 A1 | 9/2005 | Schultz |
| 2005/0197190 A1 | 9/2005 | Amaitis et al. |
| 2005/0209002 A1 | 9/2005 | Blythe et al. |
| 2005/0215306 A1 | 9/2005 | O'Donnell et al. |
| 2005/0234774 A1 | 10/2005 | Dupree |
| 2005/0239523 A1 | 10/2005 | Longman et al. |
| 2005/0239524 A1 | 10/2005 | Longman et al. |
| 2005/0239546 A1 | 10/2005 | Hedrick et al. |

(56) References Cited

U.S. PATENT DOCUMENTS

| | | |
|---|---|---|
| 2005/0245306 A1 | 11/2005 | Asher et al. |
| 2005/0245308 A1 | 11/2005 | Amaitis et al. |
| 2005/0261061 A1 | 11/2005 | Nguyen et al. |
| 2005/0277471 A1 | 12/2005 | Russell et al. |
| 2005/0277472 A1 | 12/2005 | Gillan et al. |
| 2005/0282638 A1 | 12/2005 | Rowe et al. |
| 2005/0288937 A1 | 12/2005 | Verdiramo |
| 2006/0009279 A1 | 1/2006 | Amaitis et al. |
| 2006/0016877 A1 | 1/2006 | Bonalle et al. |
| 2006/0019745 A1 | 1/2006 | Benbrahim |
| 2006/0035707 A1 | 2/2006 | Nguyen et al. |
| 2006/0040741 A1 | 2/2006 | Griswold et al. |
| 2006/0058102 A1 | 3/2006 | Nguyen et al. |
| 2006/0068917 A1 | 3/2006 | Snoddy et al. |
| 2006/0069711 A1 | 3/2006 | Tsunekawa et al. |
| 2006/0076401 A1 | 4/2006 | Frerking |
| 2006/0093142 A1 | 5/2006 | Schneier et al. |
| 2006/0095790 A1 | 5/2006 | Nguyen et al. |
| 2006/0116198 A1 | 6/2006 | Leen et al. |
| 2006/0116199 A1 | 6/2006 | Leen et al. |
| 2006/0116200 A1 | 6/2006 | Leen et al. |
| 2006/0121970 A1 | 6/2006 | Khal |
| 2006/0121987 A1 | 6/2006 | Bortnik et al. |
| 2006/0121992 A1 | 6/2006 | Bortnik et al. |
| 2006/0135252 A1 | 6/2006 | Amaitis et al. |
| 2006/0135259 A1 | 6/2006 | Nancke-Krogh et al. |
| 2006/0148560 A1 | 7/2006 | Arezina et al. |
| 2006/0148561 A1 | 7/2006 | Moser |
| 2006/0160626 A1 | 7/2006 | Gatto et al. |
| 2006/0163346 A1 | 7/2006 | Lee et al. |
| 2006/0165235 A1 | 7/2006 | Carlson |
| 2006/0166740 A1 | 7/2006 | Sufuentes |
| 2006/0178216 A1 | 8/2006 | Shea et al. |
| 2006/0183522 A1 | 8/2006 | Leen et al. |
| 2006/0187029 A1 | 8/2006 | Thomas |
| 2006/0189382 A1 | 8/2006 | Muir et al. |
| 2006/0194589 A1 | 8/2006 | Saniska |
| 2006/0199649 A1 | 9/2006 | Soltys et al. |
| 2006/0205489 A1 | 9/2006 | Carpenter et al. |
| 2006/0205497 A1 | 9/2006 | Wells et al. |
| 2006/0209810 A1 | 9/2006 | Krzyzanowski et al. |
| 2006/0224046 A1 | 10/2006 | Ramadas et al. |
| 2006/0234631 A1 | 10/2006 | Dieguez |
| 2006/0234791 A1 | 10/2006 | Nguyen et al. |
| 2006/0236395 A1 | 10/2006 | Barker et al. |
| 2006/0246990 A1 | 11/2006 | Downes |
| 2006/0247039 A1 | 11/2006 | Lerner et al. |
| 2006/0247041 A1 | 11/2006 | Walker et al. |
| 2006/0252530 A1 | 11/2006 | Oberberger et al. |
| 2006/0258429 A1 | 11/2006 | Manning et al. |
| 2006/0277413 A1 | 12/2006 | Drews |
| 2006/0287092 A1 | 12/2006 | Walker et al. |
| 2006/0287098 A1 | 12/2006 | Morrow et al. |
| 2007/0001841 A1 | 1/2007 | Anders et al. |
| 2007/0003034 A1 | 1/2007 | Schultz et al. |
| 2007/0015564 A1 | 1/2007 | Walker et al. |
| 2007/0021213 A1 | 1/2007 | Foe et al. |
| 2007/0026939 A1 | 2/2007 | Asher et al. |
| 2007/0032301 A1 | 2/2007 | Acres et al. |
| 2007/0054739 A1 | 3/2007 | Amaitis et al. |
| 2007/0060305 A1 | 3/2007 | Amaitis et al. |
| 2007/0060306 A1 | 3/2007 | Amaitis et al. |
| 2007/0060312 A1 | 3/2007 | Dempsey et al. |
| 2007/0060326 A1 | 3/2007 | Juds et al. |
| 2007/0060355 A1 | 3/2007 | Amaitis et al. |
| 2007/0060358 A1 | 3/2007 | Amaitis et al. |
| 2007/0087843 A1 | 4/2007 | Steil et al. |
| 2007/0093296 A1 | 4/2007 | Asher et al. |
| 2007/0099697 A1 | 5/2007 | Nelson |
| 2007/0099703 A1 | 5/2007 | Terebilo |
| 2007/0117604 A1 | 5/2007 | Hill |
| 2007/0117634 A1 | 5/2007 | Hamilton et al. |
| 2007/0136817 A1 | 6/2007 | Nguyen |
| 2007/0167237 A1 | 7/2007 | Wang et al. |
| 2007/0190494 A1 | 8/2007 | Rosenberg |
| 2007/0213120 A1 | 9/2007 | Beal et al. |
| 2007/0238443 A1 | 10/2007 | Richardson |
| 2007/0238507 A1 | 10/2007 | Sobel et al. |
| 2007/0241187 A1 | 10/2007 | Alderucci et al. |
| 2007/0257101 A1 | 11/2007 | Alderucci et al. |
| 2008/0004121 A1 | 1/2008 | Gatto et al. |
| 2008/0009344 A1 | 1/2008 | Graham et al. |
| 2008/0015013 A1 | 1/2008 | Gelman et al. |
| 2008/0026829 A1 | 1/2008 | Martin et al. |
| 2008/0026844 A1 | 1/2008 | Wells et al. |
| 2008/0051171 A1 | 2/2008 | Lutnick et al. |
| 2008/0058048 A1 | 3/2008 | Lutnick et al. |
| 2008/0058049 A1 | 3/2008 | Lutnick et al. |
| 2008/0070667 A1 | 3/2008 | Lutnick et al. |
| 2008/0076505 A1 * | 3/2008 | Nguyen et al. .................. 463/16 |
| 2008/0076572 A1 * | 3/2008 | Nguyen et al. .................. 463/42 |
| 2008/0085769 A1 | 4/2008 | Lutnick et al. |
| 2008/0102957 A1 | 5/2008 | Burman et al. |
| 2008/0113785 A1 | 5/2008 | Alderucci et al. |
| 2008/0113786 A1 | 5/2008 | Alderucci et al. |
| 2008/0113787 A1 | 5/2008 | Alderucci et al. |
| 2008/0139306 A1 | 6/2008 | Lutnick et al. |
| 2008/0146323 A1 | 6/2008 | Hardy et al. |
| 2008/0161101 A1 | 7/2008 | Lutnick et al. |
| 2008/0167106 A1 | 7/2008 | Lutnick et al. |
| 2008/0182644 A1 | 7/2008 | Lutnick et al. |
| 2008/0191418 A1 | 8/2008 | Lutnick et al. |
| 2008/0207302 A1 | 8/2008 | Lind et al. |
| 2008/0214261 A1 | 9/2008 | Alderucci |
| 2008/0214286 A1 | 9/2008 | Lutnick et al. |
| 2008/0248849 A1 | 10/2008 | Lutnick et al. |
| 2008/0254881 A1 | 10/2008 | Lutnick et al. |
| 2008/0254897 A1 | 10/2008 | Saunders et al. |
| 2008/0305856 A1 | 12/2008 | Walker et al. |
| 2008/0311994 A1 | 12/2008 | Amaitis et al. |
| 2008/0318670 A1 | 12/2008 | Zinder et al. |
| 2009/0029780 A1 | 1/2009 | Amaitis et al. |
| 2009/0055204 A1 | 2/2009 | Pennington et al. |
| 2009/0088232 A1 | 4/2009 | Amaitis et al. |
| 2009/0098925 A1 | 4/2009 | Gagner et al. |
| 2009/0117989 A1 | 5/2009 | Arezina et al. |
| 2009/0325708 A9 | 12/2009 | Kerr |
| 2010/0062834 A1 | 3/2010 | Ryan |

FOREIGN PATENT DOCUMENTS

| | | |
|---|---|---|
| DE | 19952691 | 5/2001 |
| DE | 19952692 | 5/2001 |
| DE | 10060079 | 6/2002 |
| EP | 1045346 | 10/2000 |
| EP | 1063622 | 12/2000 |
| EP | 1120757 | 1/2001 |
| EP | 1231577 | 8/2002 |
| EP | 1291830 A2 | 3/2003 |
| EP | 1480102 A2 | 11/2004 |
| EP | 1259930 B1 | 6/2005 |
| EP | 1480102 A3 | 10/2008 |
| GB | 2 406 291 | 3/2005 |
| JP | 2000049046 | 2/2000 |
| JP | 200218125 | 7/2000 |
| JP | 200326491 | 10/2000 |
| JP | 200345435 | 11/2000 |
| JP | 200387614 | 12/2000 |
| JP | 2001/212363 | 8/2001 |
| JP | 2001-340656 | 12/2001 |
| JP | 2001-526550 | 12/2001 |
| JP | 2002-049681 | 2/2002 |
| JP | 2002-056270 | 2/2002 |
| JP | 2002107224 | 2/2002 |
| JP | 2003 078591 | 3/2003 |
| JP | 2003166050 | 6/2003 |
| JP | 2003 228642 | 8/2003 |
| JP | 2002024979 | 8/2003 |
| JP | 2004-536638 | 12/2004 |
| JP | 2005 005936 | 1/2005 |
| RU | 2190477 | 10/2002 |
| WO | WO 80/02512 A1 | 11/1980 |
| WO | WO93/10508 | 5/1993 |
| WO | WO 94/10658 | 5/1994 |

(56) References Cited

FOREIGN PATENT DOCUMENTS

| | | |
|---|---|---|
| WO | WO 94/16416 | 7/1994 |
| WO | WO 95/24689 A1 | 9/1995 |
| WO | WO 96/00950 A1 | 1/1996 |
| WO | WO 96/15837 A1 | 5/1996 |
| WO | WO 98/09694 A1 | 3/1998 |
| WO | WO 99/04873 A1 | 2/1999 |
| WO | WO 99/08762 A1 | 2/1999 |
| WO | WO 99/19027 | 4/1999 |
| WO | WO99/42964 | 8/1999 |
| WO | WO 99/52077 | 10/1999 |
| WO | WO 00/77753 A1 | 12/2000 |
| WO | 01/20538 | 3/2001 |
| WO | WO 01/17262 A1 | 3/2001 |
| WO | WO 02/37246 | 5/2001 |
| WO | WO 01/40978 A2 | 6/2001 |
| WO | WO 01/48712 A1 | 7/2001 |
| WO | WO 01/48713 A1 | 7/2001 |
| WO | WO 01/54091 | 7/2001 |
| WO | 01/67218 | 9/2001 |
| WO | WO 01/82176 | 11/2001 |
| WO | WO 01/84817 A1 | 11/2001 |
| WO | WO 01/89233 A3 | 11/2001 |
| WO | WO 02/10931 A1 | 2/2002 |
| WO | WO 02/21457 A1 | 3/2002 |
| WO | WO 02/39605 A1 | 5/2002 |
| WO | WO 02/41199 A3 | 5/2002 |
| WO | WO 02/47042 | 6/2002 |
| WO | WO 02/065750 A2 | 8/2002 |
| WO | WO 02/071351 A2 | 9/2002 |
| WO | WO 02/077931 A1 | 10/2002 |
| WO | WO02/101486 | 12/2002 |
| WO | WO 02/101486 A3 | 12/2002 |
| WO | WO 03/005743 | 1/2003 |
| WO | 03/015299 A1 | 2/2003 |
| WO | WO 03/013678 A1 | 2/2003 |
| WO | WO 03/021543 | 3/2003 |
| WO | WO 03/027970 A2 | 4/2003 |
| WO | 03/045519 | 6/2003 |
| WO | 03/081447 | 10/2003 |
| WO | WO 2004/000428 A1 | 12/2003 |
| WO | WO 2004/003810 A1 | 1/2004 |
| WO | WO 2004/014506 A1 | 2/2004 |
| WO | WO 2004/023253 A3 | 3/2004 |
| WO | 2004/027689 A2 | 4/2004 |
| WO | WO 2004/073812 A2 | 9/2004 |
| WO | WO 2004/095383 | 11/2004 |
| WO | WO 2004/104763 A2 | 12/2004 |
| WO | WO 2004/114235 A1 | 12/2004 |
| WO | WO 2005/015458 A1 | 2/2005 |
| WO | WO 2005/026870 A2 | 3/2005 |
| WO | WO 2005/031627 A1 | 4/2005 |
| WO | WO 2005/031666 A1 | 4/2005 |
| WO | WO 2005/036425 A1 | 4/2005 |
| WO | WO 2005/050574 A2 | 6/2005 |
| WO | WO2005098650 | 10/2005 |
| WO | 2006/023230 | 3/2006 |
| WO | WO 2007/008601 A2 | 1/2007 |
| WO | WO97/19537 | 5/2007 |

OTHER PUBLICATIONS

U.S. Appl. No. 11/063,311 entitled *System and Method for Convenience Gaming* by Lee M. Amaitis, et al., filed Feb. 21, 2005.
Solutions for Restaurants, Hotels & Resorts and Clubs—Guest bridge, Inc. (online). Guestbridge, Inc. Feb. 6, 2007 [retrieved on Aug. 21, 2008]. Retrieved from the Internet: <URL: http://web.archive.org/web/20070206134139/www.guestbridge.com/solutions.html, entire document especially p. 1.
Notification of Transmittal of the International Search Report and the Written Opinion of the International Searching Authority, or the Declaration for International Application No. PCT/US08/56120, 14 pages, 8/29/8.
U.S. Appl. No. 11/839,404, filed Aug. 15, 2007.
U.S. Appl. No. 11/839,412, filed Aug. 15, 2007.
U.S. Appl. No. 11/683,476, filed Mar. 8, 2007.
U.S. Appl. No. 11/683,508, filed Mar. 8, 2007.
U.S. Appl. No. 11/685,999, filed Mar. 14, 2007.
U.S. Appl. No. 12/197,809, filed 8/25/8.
U.S. PTO Office Action for U.S. Appl. No. 11/256,568; 17 pages; Oct. 21, 2008.
U.S. Appl. No. 11/686,354, filed Mar. 15, 2007, entitled "Game Access Device with Time Varying Signal."
Office Action for U.S. Appl. No. 11/063,311 entitled System and Method for Convenience Gaming by Lee M. Amaitis, et al.; Jul. 10, 2008.
United States Patent and Trademark Office: Office Action for U.S. Appl. No. 11/199,835, filed Aug. 9, 2005; in the name of Lee M. Amaitis; 17 pages; Mar. 2, 2007.
Australian Patent Office Written Opinion and Search Report for Application No. SG 200605830-9; 11 pages; Nov. 29, 2007.
Notification of Transmittal of the International Search Report and the Written Opinion of the International Searching Authority for International Application No. PCT/US06/26348; 9 pages; Dec. 28, 2007.
United States Patent and Trademark Office: Office Action for U.S. Appl. No. 11/063,311, filed Feb. 21, 2005, in the name of Lee M. Amaitis; 18 pages; May 4, 2007.
United States Patent and Trademark Office: Office Action for U.S. Appl. No. 11/063,311, filed Feb. 21, 2005 in the name of Lee M. Amaitis; 27 pages; Oct. 31, 2007.
Janna Lindsjö, et al.; *GIGANT—an Interactive, Social, Physical and Mobile Game*; PDC 2002 Proceedings of the Participatory Design Conference; Malmö, Sweden; 5 pages; Jun. 23-25, 2002.
Notification of Transmittal of the International Search Report and the Written Opinion of the International Searching Authority for International Application PCT/US06/26599; 7 pages; Sep. 24, 2007.
*Notification of Transmittal of the International Search Report and the Written Opinion of the International Searching Authority* for International Application PCT/US06/06315; 10 pages; Sep. 24, 2007.
*USPTO Office Action Summary* for U.S. Appl. No. 11/201,812, filed Aug. 10, 2005; 32 pages; Sep. 27, 2007.
Stephan Neuert, et al.; The British Library; *Delivering Seamless Mobile Services Over Bluetooth*; 11 pages; date unknown.
Business Wire; *Home Gambling Network Inc., With U.S. Pat. No. 5,800,268—Business/Gambling—HGN and UUNET, a WorldCom/MCI Company, Reach a Mutually Satisfactory Resolution in Patent Suit*; 2 pages; Mar. 19, 1999.
PR Newswire; *Nokia N-Gage (TM) Mobile Game Deck—The Revolutionary Gaming Experience; Major Global Games Publishers Excited to Publish on Wireless Multiplayer Platform*; 3 pages; Feb. 6, 2003.
Business Wire; *GoldPocket Interactive Launches EM Mobile Matrix, Industry's First Fully Synchronous Interactive Television and Massively Multi-Player Gaming Solution*; 2 pages; Mar. 17, 2003.
Brand Strategy; *The National Lottery has announced that UK consumers will be able to purchase tickets using the internet, TV and Mobile phones.* (Launches & Rebrands); ISSN 0965-9390; 1 page; Apr. 2003.
PR Newswire; *Ideaworks3D appointed by Eidos Interactive to Develop Blockbuster Line-up for Nokia N-Gage Mobile Game Deck*; 2 pages; May 23, 2003.
Telecomworldwire; *New mobile lottery service launched by mLotto*; 1 page; Oct. 30, 2003.
Singh, et al.; *Anywhere, Any-Device Gaming*; Human Interface Technology Laboratory; National University of Singapore; 4 pages; 2004.
Wu, et al; The Electronic Library; *Real Tournament—Mobile Context-Aware Gaming for the Next Generation*; vol. 22; No. 1; ISBN 0-86176-934-1; ISSN 0264-0473; 11 pages; 2004.
*Precision Marketing*; vol. 16, No. 11; ISSN 0955-0836; 2 pages; Jan. 9, 2004.
Online Reporter; *GTECH Takes Lottery Mobile*; 1 page; Feb. 28, 2004.
Personal and Ubiquitous Computing; *Human Pacman: a mobile, wide-area entertainment system based on physical, social, and ubiquitous computing*; 12 pages; May 2004.
PR Newswire; *M7 Networks Partners With Terraplay to Deliver Real-Time Multiplayer Gaming Functionality to Its Community Services Offerings*; 2 pages; Jun. 1, 2004.

(56) References Cited

OTHER PUBLICATIONS

China Telecom; *Win Win Gaming Inc. announces agreement to provide wireless lottery and entertainment content in Shanghai*; vol. 11, No. 9; 2 pages; Sep. 2004.
Business Wire; *EA Announces Next Step Into Mobile Gaming; Digital Bridges Named as Strategic Partner for Distribution of Mobile Interactive Entertainment in Europe, North and South America*; 3 pages; Sep. 2, 2004.
Wireless News; *Mobile Casinos, Lotteries Good News for Mobile Revenues*; 2 pages; Feb. 23, 2005.
Business Wire; *MobileGamingNow, Inc. Announces the Launch of the First Ever Mobile Phone Interactive, Multi-Player Gaming System for Poker*; 2 pages; Apr. 4, 2005.
Business Wire; *InfoSpace's Golf Club 3D Scores Hole-in-One for Exciting and Realistic Game Play; InfoSpace's 3D Golf Captures the Challenge and Realism of the Sport With Real-Time 3D Animation, Weather Effects, and Customizable Characters*; 2 pages; Apr. 21, 2005.
Business Wire; *July Systems' Play2Win Interactive Game Service Launched on UK's MobileGaming.com; Speedy Customer Deployments Now Possible With July's New UK Mobile Retailing Infrastructure*; 2 pages; May 4, 2005.
U.S. Appl. No. 11/199,835 entitled *System and Method for Wireless Gaming System With User Profiles* by Lee M. Amaitis, et al., filed Aug. 9, 2005.
U.S. Appl. No. 11/199,831 entitled *System and Method for Wireless Gaming System With Alerts* by Lee M. Amaitis, et al., filed Aug. 29, 2005.
U.S. Appl. No. 11/199,964 entitled *System and Method for Providing Wireless Gaming as a Service Application* by Lee M. Amaitis, et al., filed Aug. 9, 2005.
U.S. Appl. No. 11/201,812 entitled *System and Method for Wireless Gaming With Location Determination* by Lee M. Amaitis, et al., filed Aug. 10, 2005.
U.S. Appl. No. 11/210,482 entitled *System and Method for Peer-to-Peer Wireless Gaming* by Lee M. Amaitis, et al., filed Aug. 24, 2005.
U.S. Appl. No. 11/256,568 entitled *System and Method for Wireless Lottery* by Joe M. Asher, et al., filed Oct. 21, 2005.
U.S. Appl. No. 11/557,125 entitled *System and Method for Convenience Gaming* by Lee M. Amaitis, et al., filed Nov. 7, 2006.
U.S. Appl. No. 11/557,131 entitled *System for Convenience Gaming* by Lee M. Amaitis, et al., filed Nov. 7, 2006.
Gaming Labs Certified™; Standard Series; *GLI-26: Wireless Gaming System Standards*; Version: 1.1; 28 pages; Jan. 18, 2007.
*Notification of Transmittal of the International Search Report and the Written Opinion of the International Searching Authority, or the Declaration*, for International Application No. PCT/US06/26343, 8 pages, Jan. 19, 2007.
*Notification of Transmittal of the International Search Report and the Written Opinion of the International Searching Authority, or the Declaration*, for International Application No. PCT/US06/26600, 8 pages, Jan. 19, 2007.
*Notification of Transmittal of the International Search Report and the Written Opinion of the International Searching Authority, or the Declaration* for International Application No. PCT/US06/26346, 8 pages, Mar. 29, 2007.
*Notification of Transmittal of the International Search Report and the Written Opinion of the International Searching Authority, or the Declaration* for International Application No. PCT/US05/05905, 10 pages, Apr. 10, 2007.
Gaming Labs Certified™; Standard Series; *GLI-11: Gaming Devices in Casinos*; Version: 2.0; 96 pages; Apr. 20, 2007.
*Notification of Transmittal of the International Search Report and the Written Opinion of the International Searching Authority, or the Declaration* for International Application No. PCT/US06/26350, 8 pages, Apr. 27, 2007.
Gaming Labs Certified™; Standard Series; *GLI-21: Client-Server Systems*; Version: 2.1; 85 pages; May 18, 2007.
USPTO Office Action for U.S. Appl. No. 11/418,939, Dec. 17, 2007 (13 pages).
USPTO Office Action for U.S. Appl. No. 11/418,939, Aug. 20, 2008 (12 pages).
USPTO Office Action for U.S. Appl. No. 11/418,939, Apr. 10, 2007.
U.S. Appl. No. 11/418,939, filed May 5, 2006, entitled "Systems and methods for providing access to wireless gaming devices."
U.S. Appl. No. 11/406,783, filed May 5, 2006 entitled "Systems and methods for providing access to wireless gaming devices."
*United States Patent and Trademark Office, Office Action* for U.S. Appl. No. 11/210,482; 26 pages; Jul. 27, 2007.
*Australian Patent Office; Examination Report* for Singapore Patent Application No. 0605830-9; 5 pages; Jul. 7, 2008.
*PCT Notification of Transmittal of the International Search Report and the Written Opinion of the International Searching Authority* for International Application No. PCT/US07/66873; 4 pages; Aug. 4, 2008.
*PCT Notification of Transmittal of the International Search Report and the Written Opinion of the International Searching Authority* for International Application No. PCT/US2008/057239; 8 pages; Aug. 7, 2008.
U.S. PTO Office Action for U.S. Appl. No. 11/199,831; 9 pages; Dec. 19, 2008.
U.S. PTO Office Action for U.S. Appl. No. 10/835,995; 11 pages; Jan. 22, 2009.
U.S. PTO Office Action for U.S. Appl. No. 11/406,783; Feb. 9, 2009.
Australian Examination Report for AU Application 2006269418; 2 pages; Mar. 12, 2009.
U.S. PTO Office Action for U.S. Appl. No. 11/063,311; 14 pages; Apr. 29, 2009.
U.S. PTO Office Action for U.S. Appl. No. 11/210,482; 24 pages; Apr. 29, 2009.
U.S. PTO Office Action for U.S. Appl. No. 11/683,476; 8 pages; Jun. 24, 2009.
U.S. PTO Office Action for U.S. Appl. No. 10/897,822; 7 pages; Jan. 23, 2009.
U.S. PTO Office Action for U.S. Appl. No. 10/897,822; 7 pages; Jul. 16, 2008.
U.S. PTO Office Action for U.S. Appl. No. 10/897,822 14 pages; Aug. 31, 2007.
U.S. PTO Office Action for U.S. Appl. No. 10/897,822; 16 pages; Feb. 22, 2007.
U.S. PTO Office Action for U.S. Appl. No. 10/897,822; 17 pages; Aug. 5, 2009.
U.S. PTO Office Action for U.S. Appl. No. 10/897,822; 7 pages; Feb. 6, 2008.
Applicants Response, Claims, Arguments and Remarks dated 4/23/9 for U.S. Appl. No. 10/897,822; 18 pages.
Applicants Response, Claims, Arguments and Remarks dated 10/13/8 for U.S. Appl. No. 10/897,822; 14 pages.
Applicants Response, Claims, Arguments and Remarks dated 6/4/8 for U.S. Appl. No. 10/897,822; 14 pages.
Applicants Response, Claims, Arguments and Remarks dated 11/19/7 for U.S. Appl. No. 10/897,822; 13 pages.
Applicants Response, Claims, Arguments and Remarks dated 5/23/7 for U.S. Appl. No. 10/897,822; 17 pages.
Applicants Summary of Interview with Examiner dated 6/13/7 for U.S. Appl. No. 10/897,822; 2 pages.
EPO Examination Report for EP Application No. 05775503.5-1238 dated Jul. 23, 2007; 5; 5 pages.
PCT International Seacrh Report and Written Opinion for International Application No. PCT/US2005/025722; 051102; 11 pages.
U.S. PTO Office Action for U.S. Appl. No. 11/686,354; Oct. 1, 2009; 9 pages.
Canadian Examination Report for CA Application No. 2613338; 4 pages; 10/5/9.
Notice of Allowance for U.S. Appl. No. 11/406,783; 6 pages; 9/28/9.
International Search Report for International Application No. PCT/US07/84669; 2 pages; Jun. 6, 2008.
U.S. Appl. No. 11/559,933, filed Nov. 15, 2006 in the name of Alderucci et al.
U.S. Appl. No. 11/559,829, filed Nov. 14, 2006 in the name of Alderucci et al.
U.S. Appl. No. 11/559,484, filed Nov. 14, 2006 in the name of Alderucci et al.

(56) References Cited

OTHER PUBLICATIONS

Canadian Examination Report for CA Application No. 2613362; 4 pages; 10/13/9.
USPTO Office Action for U.S. Appl. No. 11/553,142, Dec. 23, 2008 (11 pages).
Notice of Allowance for U.S. Appl. No. 11/199,831; 5 pages; 10/21/9.
USPTO Office Action for U.S. Appl. No. 11/553,142, Sep. 3, 2009 (28 pages).
U.S. PTO Office Action for U.S. Appl. No. 11/557,131; 7 pages; 9/29/9.
AU 1st examination report for AU Applciation No. 2006269267; Feb. 16, 2009; 4 pages.
AU 2nd examination report for AU Applciation No. 2006269267; Oct. 21, 2009; 5 pages.
U.S. PTO Office Action for U.S. Appl. No. 11/557,125; 10 pages; Nov. 9, 2009.
USPTO Office Action for U.S. Appl. No. 11/559,829, mailed Nov. 3, 2009, 23 pp.
USPTO Office Action for U.S. Appl. No. 11/559,933, mailed Oct. 20, 2009, 18 pp.
USPTO Office Action for U.S. Appl. No. 11/559,484, mailed Nov. 3, 2009, 32 pp.
U.S. PTO Office Action for U.S. Appl. No. 11/199,964; 18 pages; Nov. 30, 2009.
U.S. PTO Office Action for U.S. Appl. No. 11/683,476; 12 pages; 12/24/9.
International Search Report and Written Opinion for PCT Application PCT/US2010/023579; 13 pages; Apr. 16, 2010.
U.S. Appl. No. 12/367,566, filed Feb. 9, 2009; 47 pages.
Notice of Acceptance for AU Application No. 2006269267; 8 pages; May 3, 2010.
Canadian Office Action for CA Application No. 2613084; Mar. 29, 2010; 4 pages.
Notice of Allowance for U.S. Appl. No. 11/686,354; Apr. 29, 2010; 6 pages.
U.S. PTO Office Action for U.S. Appl. No. 11/199,964; 15 pages; May 25, 2010.
U.S. PTO Office Action for U.S. Appl. No. 11/683,508; 10 pages; Apr. 15, 2010.
Notice of Allowance for U.S. Appl. No. 11/256,568; 18 pages; Jun. 7, 2010.
U.S. PTO Office Action for U.S. Appl. No. 11/685,997; May 12, 2010; 11 pages.
U.S. PTO Office Action for U.S. Appl. No. 11/681,443; 11 pages; Jan. 11, 2010.
Notice of Allowability for U.S. Appl. No. 11/199,835; Apr. 10, 2010; 2 pages.
Notice of Panel Decision for U.S. Appl. No. 11/553,142; 2 pages; Feb. 3, 2010.
Notice of Panel Decision for U.S. Appl. No. 11/553,130; 2 pages; May 13, 2010.
Office Action for Japanese Patent Application No. 2007-500972; Feb. 23, 2010; 3 pages; with translation 3 pages.
Office Action for Japanese Patent Application No. 2007-556420; Feb. 23, 2010; 4 pages; with translation 4 pages.
AU Examination Report for AU Application No. 2006269413; 2 pages; Apr. 29, 2009.
Notice of Acceptance for AU Application No. 2006269420; 16 pages; May 3, 2010.
AU Examination Report for AU Application No. 2006269413; 2 pages; Sep. 7, 2009.
Canadian Examination Report for CA Application No. 2613335; 4 pages; Oct. 13, 2009.
Office Action for Japanese Patent Application No. 2008-520419 ; Feb. 2, 2010; 8 pages; with translation 8 pages.
AU Examination Report for AU Application No. 2008239516; 3 pages; May 14, 2010.
AU Examination Report for AU Application No. 2008201005; 3 pages; Aug. 11, 2009.
AU Examination Report for AU Application No. 2007216729; 5 pages; Dec. 3, 2008.
U.S. PTO Office Action for U.S. Appl. No. 11/559,829; 29 pages; Jun. 22, 2010.
U.S. PTO Office Action for U.S. Appl. No. 10/897,822; 14 pages; Feb. 4, 2010.
Applicants Response, Claims, Arguments and Remarks dated Dec. 7, 2009 for U.S. Appl. No. 10/897,822; 18 pages.
AU Examination Report for AU Application No. 2007319235; Jul. 6, 2010; 2 pages.
AU Examination Report for AU Application No. 2006269418; 2 pages; Oct. 27, 2009.
AU Examination Report for AU Application No. 2006269416; 4 pages; Jun. 10, 2009.
U.S. PTO Office Action for U.S. Appl. No. 10/835,995; 11 pages; Jul. 12, 2010.
U.S. PTO Office Action for U.S. Appl. No. 11/559,484; 19 pages; Jul. 20, 2010.
U.S. PTO Office Action for U.S. Appl. No. 11/559,933; 37 pages; Jul. 20, 2010.
U.S. PTO Office Action for U.S. Appl. No. 10/395,963; 22 pages; Jul. 2, 2010.
Applicants Response, Claims, Arguments and Remarks dated Mar. 18, 2010 for U.S. Appl. No. 10/395,963; 17 pages.
U.S. PTO Office Action for U.S. Appl. No. 10/395,963; 26 pages; Dec. 18, 2009.
Applicants Response, Claims, Arguments and Remarks dated Oct. 9, 2009 for U.S. Appl. No. 10/395,963; 16 pages.
Applicants Response, Claims, Arguments and Remarks dated Sep. 8, 2009 for U.S. Appl. No. 10/395,963; 17 pages.
U.S. PTO Office Action for U.S. Appl. No. 10/395,963; 18 pages; Jun. 9, 2009.
Applicants Response, Claims, Arguments and Remarks dated May 20, 2009 for U.S. Appl. No. 10/395,963; 15 pages.
Applicants Response, Claims, Arguments and Remarks dated Apr. 21, 2009 for U.S. Appl. No. 10/395,963; 14 pages.
U.S. PTO Office Action for U.S. Appl. No. 10/395,963; 16 pages; Jan. 21, 2009.
Applicants Response, Claims, Arguments and Remarks dated Oct. 21, 2008 for U.S. Appl. No. 10/395,963; 14 pages.
U.S. PTO Office Action for U.S. Appl. No. 10/395,963; 11 pages; Jul. 21, 2008.
Applicants Response, Claims, Arguments and Remarks dated May 9, 2008 for U.S. Appl. No. 10/395,963; 15 pages.
U.S. PTO Office Action for U.S. Appl. No. 10/395,963; 3 pages; Mar. 10, 2008.
U.S. PTO Office Action for U.S. Appl. No. 10/395,963; 13 pages; Jan. 8, 2008.
Applicants Response, Claims, Arguments and Remarks dated Oct. 31, 2007 for U.S. Appl. No. 10/395,963; 14 pages.
U.S. PTO Office Action for U.S. Appl. No. 10/395,963; 12 pages; Sep. 19, 2007.
Applicants Response, Claims, Arguments and Remarks dated Jul. 24, 2007 for U.S. Appl. No. 10/395,963; 18 pages.
U.S. PTO Office Action for U.S. Appl. No. 10/395,963; 12 pages; Mar. 29, 2007.
Applicants Response, Claims, Arguments and Remarks dated Nov. 13, 2006 for U.S. Appl. No. 10/395,963; 19 pages.
Applicants Response, Claims, Arguments and Remarks dated Sep. 8, 2006 for U.S. Appl. No. 10/395,963; 14 pages.
U.S. PTO Office Action for U.S. Appl. No. 10/395,563; 7 pages; May 8, 2006.
US PTO Office Action for U.S. Appl. No. 10/395,988 ; Jan. 9, 2007; 7 pages.
US PTO Office Action for U.S. Appl. No. 10/395,988; Aug. 15, 2007; 4 pages.
US PTO Office Action for U.S. Appl. No. 10/395,988 ; Mar. 26, 2008; 4 pages.
US PTO Office Action for U.S. Appl. No. 12/367,566; Jul. 20, 2010; 8 pages.

(56) References Cited

OTHER PUBLICATIONS

US PTO Office Action for U.S. Appl. No. 10/395,988; Apr. 28, 2010; 9 pages.
Advisory Action for U.S. Appl. No. 10/395,963; 4 pages; May 4, 2009.
Advisory Action for U.S. Appl. No. 10/395,963; 3 pages; Apr. 8, 2008.
Examiner Interview Summary Record for U.S. Appl. No. 10/395,963; 5 pages; Apr. 7, 2008.
Miscellaneous Communication to Applicant for U.S. Appl. No. 10/395,963; 2 pages; Oct. 11, 2006.
Advisory Action for U.S. Appl. No. 10/395,963; 4 pages; Sep. 17, 2009.
Applicants Response, Claims, Arguments and Remarks dated Jul. 6, 2010 for U.S. Appl. No. 10/897,822; 15 pages.
Examiner Interview Summary Record for U.S. Appl. No. 10/897,822; 4 pages; Jun. 13, 2007.
AU Examination Report for AU Application No. 2006216723; 2 pages; Jul. 1, 2010.
CA Examination Report for CA Application No. 2612896; Aug. 30, 2010; 4 pages.
U.S. Appl. No. 12/147,005, filed Jun. 26, 2008 in the name of Howard Lutnick; 182 pages.

\* cited by examiner

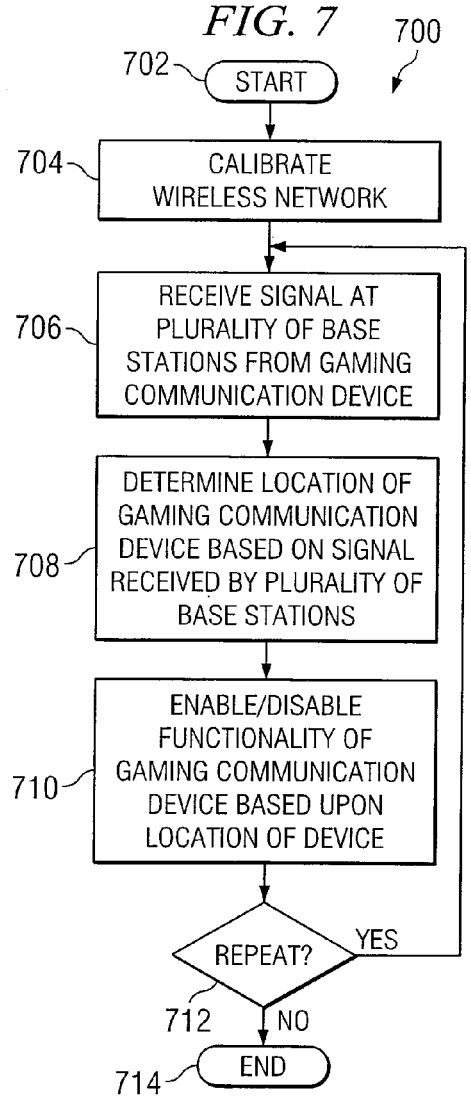
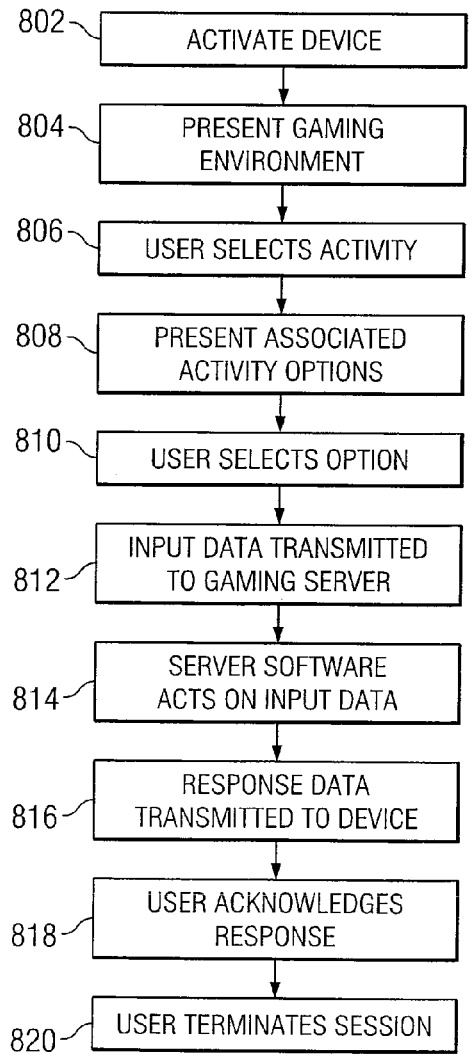

SYSTEM AND METHOD FOR WIRELESS GAMING WITH LOCATION DETERMINATION

BRIEF DESCRIPTION OF THE DRAWINGS

FIG. 7 illustrates a flowchart illustrating a method for wireless gaming having location determination in accordance with an embodiment;

FIG. 8 is a flowchart depicting steps in a gaming method according to an embodiment;

DETAILED DESCRIPTION OF EMBODIMENTS

Figure 1:
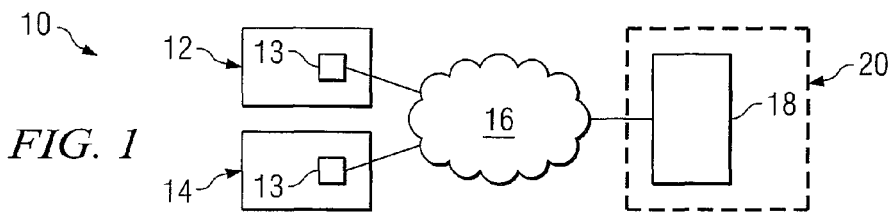
FIG. 1 illustrates a gaming system according to an embodiment.

The gaming industry allows people to participate in a variety of gaming activities within the limits of state and federal law. Possible gaming activities include gambling, such as that provided by casinos. Casino-type gambling activities include, but are not limited to, slot machines, table games, poker, keno, and other gaming activities that allow for the placement of bets. Events also may be wagered on and may include, for example, sporting events, such as horse or auto racing, and athletic competitions such as football, basketball, baseball, boxing, and golf. Gaming can also include non-wagering games and events, such as lottery contests. In a casino environment, the participation in such gaming activities is generally limited by a participant's physical location. For example, participants in casino-type gambling activities must be present at a gaming machine or at a gaming table within the casino in order to place a bet. Similarly, people interested in wagering on sporting events or athletic competitions in a casino environment must place bets through a sports book that is located in the casino.

Location-based services provide the ability to tailor the function or result of an automated system based on a location input, typically the location of a geolocation device. Geolocation devices include satellite based geolocation systems, e.g., GPS, Glonass, Galileo, etc.; long range terrestrial geolocation systems, e.g., LORAN; short-range network based geolocation systems, e.g., network based cellular e911; short range proximity location sensing, e.g., 802.11 access point identification, line-of-sight location identification, e.g., IRdA or other visible, sonic or invisible electromagnetic waves which are confined by barriers; RFID based location detectors; and the like.

In accordance with the teachings of an embodiment, a system and method with location-based input to a gaming function is provided. That is, an outcome of the gaming system is dependent, in part, on the location of the user or terminal. Typically, the user will employ a wireless gaming terminal, and therefore the input will represent the location of the wireless device, which when in use will also represent the location of the user. The location may be determined in any convenient manner, for example a manual input, satellite geolocation system, long range terrestrial geolocation system, network-based location, local sensors or transmitters, or the like. Preferably, the location is determined by a wireless-LAN network based location. Also, the location is preferably determined automatically, and is not dependent on a manual input per se, though a physical relocation of the portable terminal is itself "manually" (or pedally) determined.

Typically, in a gaming environment in which the user bets against the house, it is desired to fix the odds of winning in advance, and provide a high degree of assurance that there are no improprieties. Thus, a user typically selects a wager amount and optionally a bet (depending on the game), the result of which is then determined by a random or pseudo-random event and a contingent statistical payout. The bet in this case represents the play or win criteria, for example "red" or "black" in roulette. According to an embodiment, the user selects a wager amount, but the user location, in whole or in part determines the bet input. For example, the system may provide 39 different locations around a casino, each of which corresponds to a different roulette number. In order to define a bet to be placed, the user must physically be present within a predetermined location region corresponding to that bet, and the location itself informs the system as to the user's bet. In like manner, the location need not be the only factor relevant to selection of the bet, and games may be available for play in which the location input is irrelevant or has difference relevance.

According to another embodiment, the user need not physically relocate every time a different bet is desired; rather, the location is used to establish the game, from which the user may then place a bet within the rules of that game. Thus, different "parlors" may be available with different games or themes. The different games may represent remappings of basic elements of a generic game, dependent on location, or may have different rules and implementation for different locations.

Because of the required physical location of persons for various embodiments of game play, there is also a possibility for making the game "social", in that persons will be incentivized to be in close proximity during various embodiments of game play. This consideration, in turn, may allow different kinds of games and/or payoffs, and may incentivized differing gaming strategies. In particular, patrons may accept games with lower anticipated payouts if the social situation is a desired one. Therefore, another embodiment provides that players provide various social, demographic, or personal information, which is employed, through information conveyed to the portable gaming terminal, to motivate persons to gather in certain locations e.g., within a casino. While "dating" motivation is a conceptually simple use of this technology, i.e., persons or groups of people who are anticipated to be socially compatible are motivated to migrate to certain locations, this may also be useful for facilitating business relationships and the like.

The location system in the portable terminal may also be used to facilitate food and/or beverage service, so that a waitperson can readily locate a patron, even if they have relocated between placing an order and receiving it. Further, the terminal may be used to place orders directly, which can then be delivered to the patron wherever he or she may be.

A casino may, for various reasons, seek to have patrons in various locations as part of a promotion, or indeed to distribute the crowd in a desired fashion. For example, an occupancy algorithm may determine that one region of a casino is overcrowded, and thus generating suboptimal revenues, while another is "dead", and not attracting new patrons. The terminal may therefore provide motivation for some or all patrons to relocate, either directly or gradually, to different locations, until an optimal distribution is detected or achieved. This "yield management system" may use traditional optimization techniques, or those specifically adapted for this purpose. It is noted that the optimization algorithm may employ a neural network or other adaptive algorithm, for example using a genetic algorithm to explore the optimization space. After optimization criteria are established, a more traditional control algorithm with predetermined function may be implemented, or at least dominate, the response of the system. In fact, each establishment may have different target parameters for optimization, and indeed may present a different value function for outcome. Thus, some establishments may value sales at storefronts in a mall area higher than others, or likewise may have different time-weighted valuations, vaguely analogous to financial discount rates. That is, some establishments may seek immediate revenues more urgently than others, which value deferred revenues or repeat customers. Likewise, in some venues, such as a comedy show, underoccupancy defeats the value for all, and therefore it may be of interest to the establishment to motivate patrons to attend an event, even if this interrupts gaming (gambling). Thus, another embodiment provides a messaging gateway for communication with a patron, independent of a game, with or without incentives for action. The incentive may be a part of a game, an option within a game, or a non-gaming function, such as a "comp".

It is noted that, by practice or by law, certain areas within a casino may be unavailable for gaming. The portable terminal may implement such restrictions using its location sensor. If a portable terminal is outside of a predetermined area, the gaming functions may be deactivated, and, for example, be replaced with non-gaming functions. For example, a similar program may be activated which does not permit betting, but otherwise allows play. Further, gambling may be limited to certain subpopulations, such as those over age 21. A camera or other biometric sensor within the device may be active to limit use to a pre-authorized person, and thus limit or prohibit transfer or loan to another, unauthorized person. In the case of a camera, an automated facial recognition algorithm may be used to authenticate the user. Alternately, fingerprints, iris scans, or other biometric indicia may be employed. In an unauthorized case (e.g., use by a minor), the gambling functions may be deactivated, but optionally non-gambling functions may remain active.

While in a preferred implementation, the odds of winning the game are unaffected by the location, other implementations do permit a change in the odds, or additional win opportunities, depending on location. There may be other differences associated with various locations. For example, the "comp points" used to reward frequent gamblers may be different for different locations. Likewise, there may be other promotions linked to particular locations, providing an incentive for users (gamblers) to situate themselves in a particular location or set of locations. The incentives may vary over time, thereby encouraging users to move to different locations.

In a casino environment, this provides at least three advantages. First, because the rules of the game are different than other games, there is a novelty factor, which maintains the interest of the player. Second, the location-relevance of the system makes it more likely that players will stay within the same venue, and not stray to competing venues. Third, the ability to promote locations within the venue provides the ancillary benefit of co-promoting internal businesses within the venue.

It is noted that the graphics displayed on the terminal, either ancillary or integral to the game, may be location dependent. Thus, the "skin" on the user interface may differ based on location information. Further, the graphic differences may relate to functional differences, such as a location-specific function or incentive.

Another embodiment is the ability to replace the traditional symbols, such as numbers or playing cards, with location icons, or even images (static or dynamic) of locations.

A further embodiment is to provide an enhanced play mode for mobile gaming terminals, which is not normally found in gaming devices, e.g., a location input as a relevant factor or independent input in a gaming environment.

A still further embodiment provides that a location corresponds to a wager. Thus, in a similar fashion that certain areas of a casino floor have gambling machines with different wager amounts, and different tables have varying bid ranges, the terminals can also implement such regional differentiation. This facilitates an establishment's efforts to maintain certain "high roller" areas, by limiting patrons from placing locationally inappropriate wagers. This, in turn, may improve the comfort of players and thus their willingness to continue playing for extended periods.

The portable terminal may also interact with a table or machine in which it is in proximity. Thus, a patron may wager either on a table directly using chips, or using the terminal. The terminal, in turn, responds to the play on the table. If a patron wishes to play a different game, he or she simply relocates proximate to a different gaming table. It is noted that for this application, short range communications, such as magnetic (H) fields, are preferred, since in a crowded casino there may otherwise be ambiguity as to the intended location of the terminal.

While a mobile gaming terminal may be self-contained and self-sufficient (and thus implement the game play internally), typically, the system includes a gaming server communicating with the mobile gaming terminals through a wireless network, which may implement the game play and communicate with the terminal as a human interface device. The wireless network is typically a short-range digital communication system which operates in unlicensed spectrum, e.g., 900 MHz, 2.4 GHz, and/or 5.8 GHz, and is preferably an infrastructure mode 802.11g and/or 802.11a, wherein a plurality of access points are distributed around the property.

The mobile gaming terminal may also provide a social mode, in which terminals communicate with each other. For example, a private poker game or other private game may be implemented in such a manner. Public games may also be implemented, such as progressive slot machines and the like, but more typically an interterminal communication scheme is implemented for purely social reasons, and not related to game play, since the game play (other than in private games) is typically tightly controlled by the venue.

The mobile gaming communication device is operable to transmit and receive gaming information to and from the gaming server via the wireless network. A location of the gaming communication device on the property may be determined based upon a signal received by a plurality of access points from the mobile gaming communication device, using network-based location techniques. Based upon the location of the gaming communication device on the property, a predetermined functionality of the gaming communication device may be enabled, or the location may represent a variable input into a gaming function.

In another embodiment, the method for wireless gaming with location determination includes providing a wireless network comprising a plurality of signal detection devices, the wireless network at least partially covering the property; receiving at the plurality of signal detection devices a signal from at least one wireless communication device; determining a location of the at least one wireless communication device based upon the signal received by the plurality of signal detection devices; and modifying, or controlling a predetermined functionality of the wireless communication device based upon the location of the wireless communication device. This functionality is preferably a parameter in a gaming function, though as discussed above other alternates exist.

Another embodiment employs location information to limit the functionality of the gaming device. For example, the device may be inoperative when located off site or in prohibited zones. Likewise, certain rooms or areas may be off-limits or unavailable during certain times; for example, portable gaming devices may be inoperative in the nightclub during a show. Likewise, in a finer restaurant, the portable gaming devices may be inoperative. Further, public rest rooms may also be unavailable as gaming locations. As discussed above, a gaming device may optionally limit wagering capability in dependence on location, but still permit game play.

Instead of completely limiting operation, available modes of operation may be altered in dependence on location. For example, in some locations, sound effects may be limited or excluded. On the casino floor, it may be appropriate to control which games may be played at certain locations, e.g., no electronic roulette near the roulette table. As discussed above, the device may have controlled social groupings, so that, for example, when near a certain location, such as the roulette table, it may join that game, but no other.

In many cases, the relevant location is a room or room region. Advantageously, a communications infrastructure access point may be limited in range to that region, for example by RF shielding, antenna design, and antenna location. Even if unambiguous location based on a single in-range access point, or antenna is not possible, network based location technologies (using multiple access points) may be used to triangulate or estimate the location. GPS technology may also be employed, although in a relatively small, static environment, it is generally not necessary and may be subject to interference.

A technical advantage of particular embodiments may include the ability to enable or disable different functionalities of a wireless communication device based upon the location of the device on a property. For example, the gambling functionality of the device may be disabled when the device is located in a hotel room at a casino, but enabled when the device is located in other parts of the casino.

An embodiment also provides the ability to communicate information to the user of the wireless communication device in dependence on the location of the device. For example, a user may be sent a message tailored to the user's location on property, such as information about events occurring elsewhere on the property and directions to those events. Likewise, reservations may be made through the device, and patrons informed when their reservation is available. This, in turn, can limit lines and time lost waiting in lines at various locations, such as restaurants.

Other technical advantages may be readily apparent to one skilled in the art from the following figures, descriptions, and claims. Moreover, while specific advantages have been enumerated above, various embodiments may include all, some, or none of the enumerated advantages, and embodiments may have other advantages not specifically discussed herein.

A distributed gaming system enables participants to engage in gaming activities from remote and/or mobile locations. The possible gaming activities include gambling, such as that provided by casinos. Gambling activities may include any casino-type gambling activities including, but not limited to, slot machines, video poker, table games (e.g., craps, roulette, blackjack, pai gow poker, Caribbean stud poker, baccarat, etc), and the wheel of fortune game, keno, sports betting, horse racing, dog racing, jai alai, and other gambling activities. The gaming activities can also include wagering on any type of event. Events can include, for example, sporting events, such as horse or auto racing, and athletic competitions such as football, basketball, baseball, golf, etc. Events can also include such things that do not normally involve wagering. Such events may include, without limitation, political elections, entertainment industry awards, and box office performance of movies. Gaming can also include non-wagering games and events. Gaming can also include lotteries or lottery-type activities such as state and interstate lotteries. These can include all forms of number-selection lotteries, "scratch-off" lotteries, and other lottery contests. The gaming system may be implemented over a communications network such as a cellular network or a private wireless. Examples of the latter include WiFi (IEEE 802.11x), and WiMax (IEEE 802.16x) networks, as well as proposals within IEEE-802.20 working group. In one embodiment, the gaming system communications network is entirely independent of the Internet. In another embodiment, the gaming system operation makes minimal use of the Internet, such that only information for which there are no security issues is transmitted via the Internet and/or information may be encrypted. Likewise, virtual private network (VPN) technologies may be used to provide security when employing public networks, and to secure wireless communications regardless of network type.

According to one embodiment, the communications network enables players to participate in gaming from remote locations (e.g., outside of the normal gaming area of a casino). Also, the system may enable players to be mobile during participation in the gaming activities. Preferably, the system has a location verification or determination feature, which is operable to permit or disallow gaming from a remote location depending upon whether or not the location meets one or more criteria. The criterion may be, for example, whether the location is within a pre-defined area in which gaming is permitted by law.

As shown in FIG. 1, for example, gaming system 10 includes at least one user 12. The system may include additional users such that there is a second user 14. Multiple users may access a first gaming system 10, while other multiple users access a second gaming system (not shown) in communication with first gaming system 10. The system may, for example, have redundant servers and fail-safe operation, to prevent disruptions in play and to assure outcome is not altered by a single point of failure or disruption. Users 12 and 14 preferably access system 10 by way of a gaming communication device 13. Gaming communication device 13 may comprise any suitable device for transmitting and receiving electronic communications. Examples of such devices include, without limitation, mobile phones, personal data assistants (PDAs), computers, mini-computers, etc. An example of a potentially suitable device is a Sony Playstation Portable (PSP) device, which includes both 802.11b communications and IrDA, which allows localization based on network-based technologies. A GPS device may also be used with the PSP, to provide geolocation capability. An RF-ID tag may be provided in conjunction with the communication device 13 to allow external localization by local RF-ID readers.

Gaming communication devices 13 transmit and receive gaming information to and from communications network 16. Gaming information is also transmitted between network 16 and a computer 18, such as a server, which may reside within the domain of a gaming service provider 20. The location of computer 18 is not critical, however, and computer 18 may reside adjacent to or remote from the domain of gaming service provider 20. Moreover, in certain embodiments, a gaming service provider is not required. The computer 18 and/or gaming service provider 20 may reside within, adjacent to, or remote from a gaming provider (not shown in FIG. 1). The gaming provider may be an actual controller of games, such as a casino. As an example, a gaming service provider may be located on the grounds of a casino and the computer 18 may be physically within the geographic boundaries of the gaming service provider. As discussed, however, other possibilities exist for remote location of the computer 18 and the gaming service provider 20. Computer 18 may function as a gaming server. Additional computers (not expressly shown) may function as database management computers and redundant servers, for example.

Preferably, application software resides on both the gaming communication device 13 and the computer 18. Software resident on gaming communication device 13 is preferably operable to present information corresponding to gaming activities (including gambling and non-gambling activities discussed herein) to the user. The information includes, without limitation, graphical representations of objects associated with the activities, and presentation of options related to the activities and selectable by the user. The gaming communication device software is also preferably operable to receive data from the computer and data input by the user. Software resident on the computer is preferably able to exchange data with the gaming communication device, access additional computers and data storage devices, and perform all of the functions described herein as well as functions common to known electronic gaming systems. It is noted that player identification cards are generally not required, since the gaming communication device 13 is pre-registered to a user. However, in an environment where the user of the gaming communication device 13 is subject to change, user identification, such as a card reader or token identification device, may be employed. Alternately, a logical user identification, such as username and password, may be used to identify a user.

Gaming information transmitted across network 16 may include any information, in any format, which is necessary or desirable in the operation of the gaming experience in which the user participates. As discussed above, the same system and infrastructure may be used to deliver non-gaming information as well. The information may be transmitted in whole, or in combination, in any format including digital or analog, text or voice, and according to any known or future transport technologies, which may include, for example, wireline or wireless technologies. Wireless technologies may include, for example, licensed or license-exempt technologies. Some specific technologies which may be used include, without limitation, Code Division Multiple Access (CDMA), Global System for Mobile Communication (GSM), General Packet Radio Service (GPRS), WiFi (802.11x), WiMax (802.16x), Public Switched Telephone Network (PSTN), Digital Subscriber Line (DSL), Integrated Services Digital Network (ISDN), or cable modem technologies. These are examples only, and one of ordinary skill will understand that other types of communication techniques are within the scope of the embodiments. Further, it will be understood that additional components may be used in the communication of information between the users and the gaming server. Such additional components may include, without limitation, lines, trunks, antennas, switches, cables, transmitters, receivers, computers, routers, servers, fiber optical transmission equipment, repeaters, amplifiers, etc. It is noted that wireline communications typically do not present location ambiguity, and therefore the location of a wireline connection may be simply mapped. On the other hand, wireless communications typically do not impose strict location limits, and therefore determining a terminal location requires additional information.

In at least one embodiment, the communication of gaming information takes place without involvement of the Internet, i.e., through a local area network, or an intranet, or other private network. However, in certain embodiments, a portion of the gaming information may be transmitted over the Internet. Also, some or all of the gaming information may be transmitted partially over an Internet communications path. In certain embodiments, some information is transmitted entirely or partially over the Internet, but the information is either not gaming information or is gaming information that does not need to be maintained secretly. For instance, data that causes a graphical representation of a table game on the user's gaming communication device might be transmitted at least partially over the Internet, while wagering information transmitted by the user might be transmitted entirely over a non-Internet communications network or a virtual private network.

Figure 2:
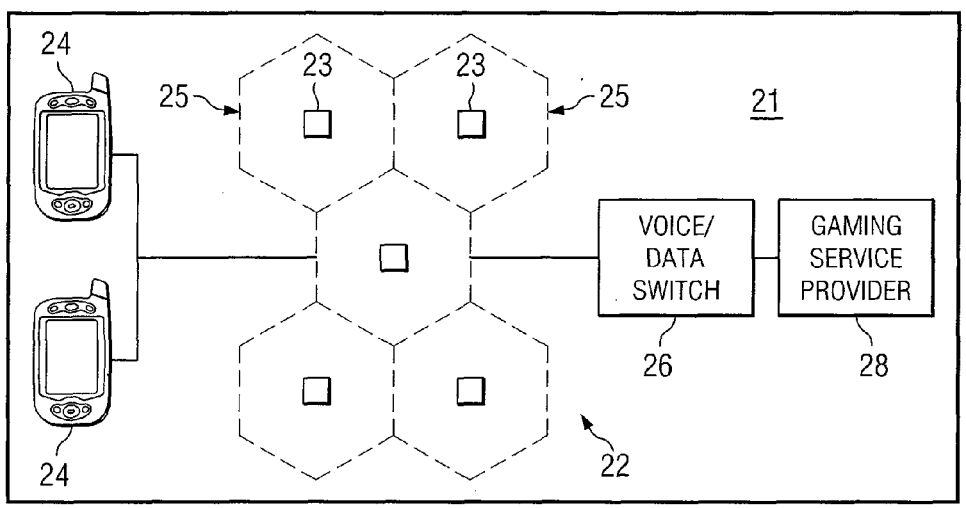
FIG. 2 illustrates a wireless gaming system according to an embodiment.

According to one embodiment, as shown in FIG. 2 for example, the communications network 14 comprises a cellular network 22. Cellular network 22 comprises a plurality of base stations 23, each of which has a corresponding coverage area 25. Base station technology is generally known and the base stations may be of any type found in a typical cellular network. The base stations may have coverage areas that overlap. Further, the coverage areas may be sectorized or non-sectorized. The network also includes mobile stations 24, which function as the gaming communication devices used by users to access the gaming system and participate in the activities available on the gaming system. Users are connected to the network of base stations via transmission and reception of radio signals. The communications network may also include at least one voice/data switch, which is preferably connected to the wireless portion of the network via a dedicated, secure landline. The communications network also includes a gaming service provider, which is likewise connected to the voice/data switch via a secure landline or encrypted secure communications channel. The voice/data switch may be connected to the wireless network of base stations via a mobile switching center (MSC), for example and the landline may be provided between the voice/data switch and the MSC.

Users access the gaming system by way of mobile stations which are in communication with, and thus part of, the communications network. The mobile station may be any electronic communication device that is operable in connection with the network as described. For example, in this particular embodiment, the mobile station may comprise a cellular telephone. Preferably, such a phone is equipped with GPS, although other technologies may be used to determine its location as required.

Preferably, in the case of a cellular network for example, the gaming system is enabled through the use of a private label carrier network. Each base station is programmed by the cellular carrier to send and receive private secure voice and/or data transmissions to and from mobile station handsets. The handsets are preferably pre-programmed with the carrier's authentication software, and may also be preprogrammed with gaming software, or download the gaming software on demand or as needed. The base stations communicate, for example, via private T1 lines to a switch. A gaming service provider may lease a private T1 or T3 line, which routes the calls back to gaming servers controlled by the gaming service provider. The base stations may also be part of a public network, and thus non-dedicated, using virtual private network technology for security. The cellular phones may be proprietary designs, provided by the venue specifically for this use, or simply existing cellular phones owned by patrons. Encryption can be installed or employed on the telephones as desired and/or if required by a gaming regulation authority, such as a gaming commission.

The cellular network may thus be a private, closed system. Mobile stations communicate with base stations and base stations are connected to a centralized switch located within a gaming jurisdiction. At the switch, voice calls are transported either locally or via long distance. Specific service provider gaming traffic is transported from the central switch to a gaming server at a host location, which can be a casino or other location. The voice network may be used to provide a concierge service to patrons, for normal telephony communicating with a cellular carrier network, the PSTN or a VOIP network, or a proprietary network.

In a dedicated private network implementation, as subscribers launch their specific gaming application, the handset will only talk to certain base stations with cells or sectors that have been engineered to be wholly within the gaming jurisdiction. For example, if a base station is close enough to pick up or send a signal across state lines, it will not be able to communicate with the device. When a customer uses the device for gaming, the system may prohibit, if desired, the making or receiving voice calls. Moreover, voice can be eliminated entirely if required. Further, the devices are preferably not allowed to "connect" to the Internet. This ensures a high level of certainty that bets/wagers originate and terminate within the boundaries of the gaming jurisdiction and the "private" wireless system cannot be circumvented or bypassed. Although in certain embodiments some data and/or voice traffic may be communicated at least partially over the Internet, it is preferred that the communication path does not include the Internet. Alternatively, in some embodiments, certain non-gaming information may be transported over a path which includes the Internet, while other information relating to the gaming activities of the system is transported on a path that does not include the Internet.

In a non-dedicated public network implementation, a location sensor on the phone, or a network-based location system to determine the location of the phone, permits accurate determination of the phone location. The phone may be loaded with an application which checks the program memory of the phone, or operational registers, to ensure that no unauthorized software is concurrently executing which would bypass or circumvent security measures. Communications are encrypted using a protocol which prevents a third party from comprehending or altering communications in progress. Likewise, the protocol authenticates the phone and/or user.

Figure 3:
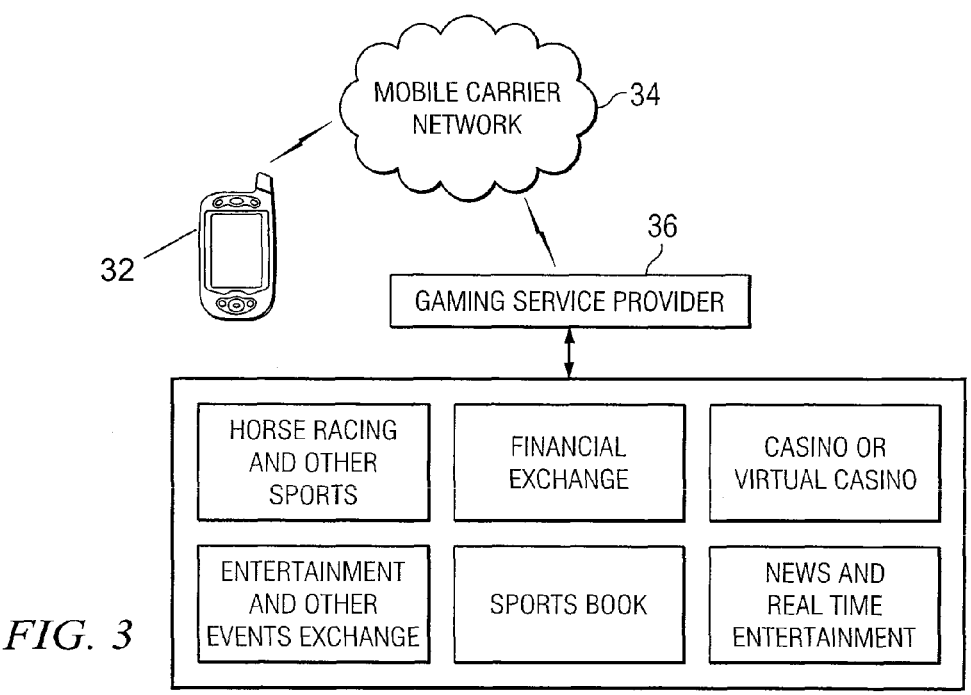
FIG. 3 is a block diagram of a gaming system illustrating various gaming activities in accordance with an embodiment.

As shown in FIG. 3, a gaming communication device 32 is in communication with a gaming service provider 36 over a network 34. The gaming service provider preferably has one or more servers, on which are resident various gaming and other applications. As shown in FIG. 3, some example gaming applications include horse racing and other sports, financial exchange, casino and/or virtual casino, entertainment and other events exchange, and news and real time entertainment. Each of these applications may be embodied in one or more software modules. The applications may be combined in any possible combination. Additionally, it should be understood that these applications are not exhaustive and that other applications may exist to provide an environment to the user that is associated with any of the described or potential activities.

Figure 4:
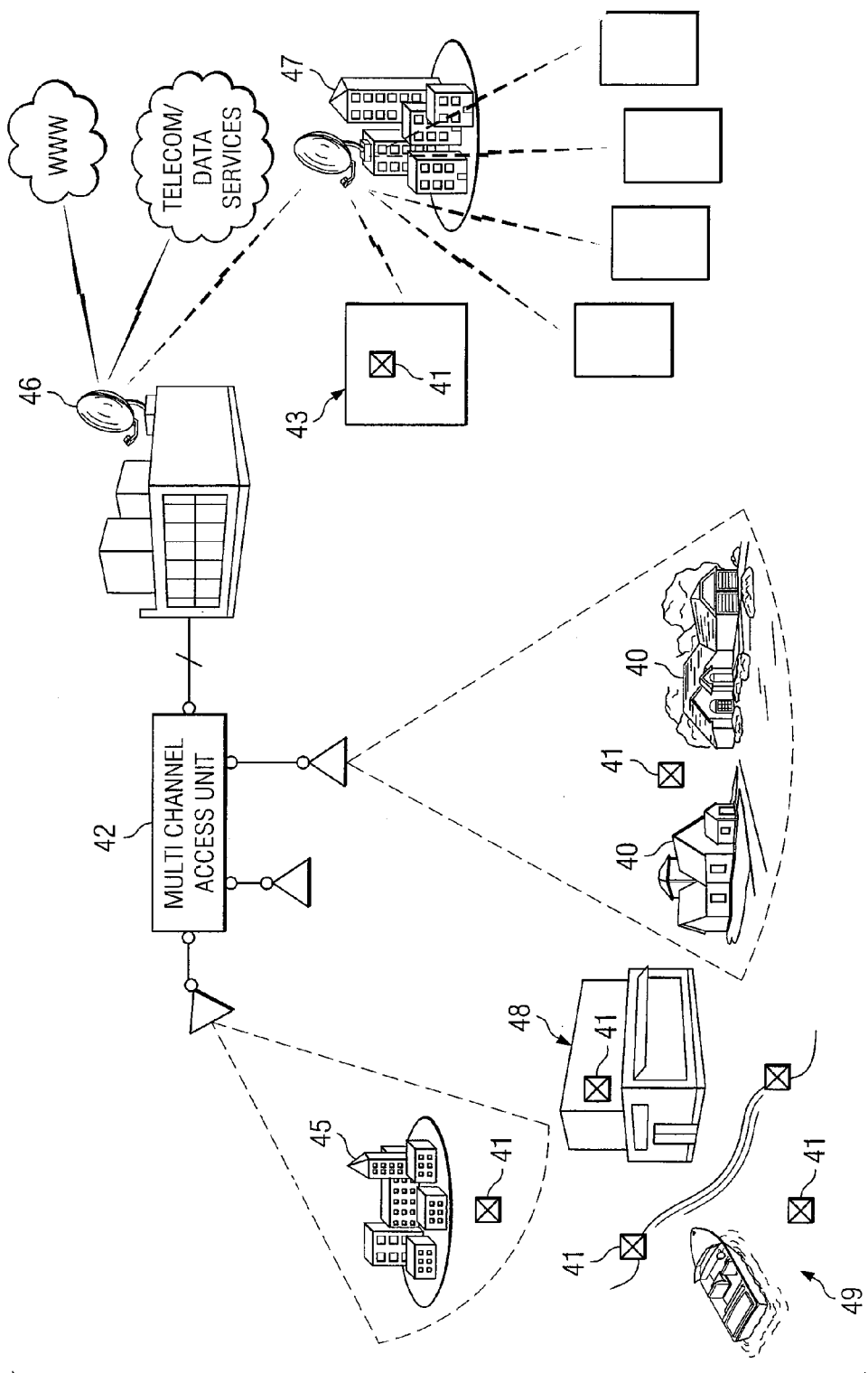
FIG. 4 illustrates a wireless gaming system showing coverage areas in accordance with an embodiment.

In another embodiment, as shown in FIG. 4, for example, the communications network comprises a private wireless network. The private wireless network may include, for example, an 802.11x (WiFi) network technology to cover "Game Spots" or "Entertainment Spots." In FIG. 4, various WiFi networks are indicated as networks 41. Networks 41 may use other communications protocols to provide a private wireless network including, but not limited to, 802.16x (WiMax) technology. Further, networks 41 may be interconnected. Also, a gaming system may comprise a combination of networks as depicted in FIG. 4. For example, there is shown a combination of private wireless networks 41, a cellular network comprising a multi-channel access unit or sectorized base station 42, and a satellite network comprising one or more satellites 46.

With respect to the private wireless network, because the preferable technology covers smaller areas and provides high-speed throughput, the private wireless network is particularly well-suited for gaming commission needs of location and identity verification for the gaming service provider products. The gaming spots enabled by networks 41 may include a current casino area 48, new areas such as swimming pools, lakes or other recreational areas 49, guest rooms and restaurants such as might be found in casino 48 or hotels 45 and 47, residential areas 40, and other remote gaming areas 43. The configuration of the overall gaming system depicted in FIG. 4 is intended only as an example and may be modified within the scope of the embodiment.

In one embodiment, the system architecture for the gaming system includes:

(1) a wireless LAN (Local Access Network) component, which comprises, for example, 802.11x (WiFi) and/or 802.16x WiMax technologies; robust security and authentication software; gaming software; mobile carrier approved handsets with Linux®, Windows® or Symbian® operating systems integrated within; and
   (a) CDMA-technology that is secure for over-the-air data protection;
   (b) at least two layers of user authentication, (that provided by the mobile carrier and that provided by the gaming service provider);
   (c) compulsory tunneling (static routing) to gaming servers;
   (d) end-to-end encryption at the application layer; and
   (e) state-of-the-art firewall and DMZ technologies;

(2) an MWAN (Metropolitan Wireless Access Network), which consists of licensed and license-exempt, point-to-point links, as well as licensed and license-exempt, point-to-multi-point technologies;

(3) private MAN (Metropolitan Access Network) T1 and T3 lines to provide connectivity where wireless services cannot reach; and (4) redundant private-line communications from the mobile switch back to the gaming server.

Each of the "Game Spots" or "Entertainment Spots" is preferably connected via the MWAN/MAN back to central and redundant game servers. For accessing the private wireless networks 41, the gaming communication devices are preferably WiFi- or WiMax-enabled PDAs or mini-laptops, and do not have to be managed by a third-party partner.

Preferably, the gaming system includes a location detection and/or verification feature, which is operable to permit or disable gaming from a remote location depending upon whether or not the location meets one or more criteria. The criterion may be, for example, whether the location is within a pre-defined area in which gaming is permitted by law. As another example, the criterion may be whether the location is in a no-gaming zone, such as a school. The location verification technology used in the system may include, without limitation, "network-based" and/or "satellite-based" technology. Network-based technology may included such technologies as multilateration, triangulation and geo-fencing, for example. Satellite-based technologies may include global positioning satellite (GPS), GLONASS and/or Galileo technology, for example.

As previously discussed, the cellular approach preferably includes the use of at least one cellular, mobile, voice and data network. For gaming in certain jurisdictions, such as Nevada for example, the technology may involve triangulation, global positioning satellite (GPS) technology, and/or geo-fencing to avoid the potential for bets or wagers to be made outside Nevada state lines. In one embodiment, the network would not cover all of a particular jurisdiction, such as Nevada. For instance, the network would not cover areas in which cellular coverage for a particular base station straddled the state line or other boundary of the jurisdiction. This is done in order to permit the use of location verification to insure against the chance of bets originating or terminating outside of the state. Triangulation may be used as a method for preventing gaming from unapproved locations. Triangulation may be accomplished, for example, by comparing the signal strength and/or time-of-flight from a single mobile station received at multiple base stations, each having GPS coordinates. This technology may be used to pinpoint the location of a mobile station. A hybrid network-satellite location system may also be employed, in which partial information is derived from each of the network and an orbiting satellite. The location can then be compared to a map or other resource to determine whether the user of the mobile station is in an unapproved area, such as a school. Alternatively, GPS technology may be used for these purposes.

Instead of simply using the location criteria as a filter, to validate used of the device, the location may also be used as an input to a gaming function. For example, the location may define a game to be played, a play option within a game, and/or a wager. Further, the determined location may determine or alter a result, such as a payoff rate, an additional win option, and/or "comp" status.

Figure 5:
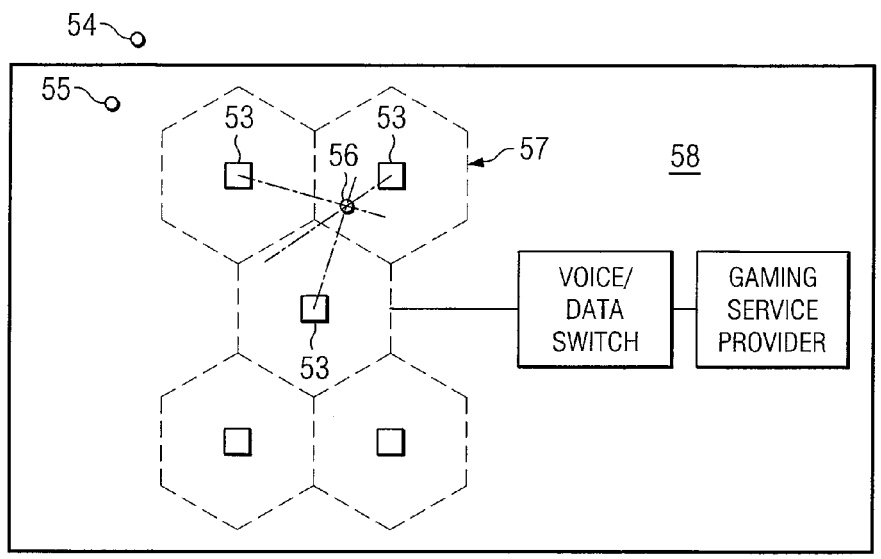
FIG. 5 illustrates a wireless gaming system showing triangulation location determination in accordance with an embodiment.

As shown in FIG. 5, the gaming system includes a plurality of gaming communication devices 54, 55, and 56. Device 54 is located outside the gaming jurisdiction 58. Devices 55 and 56 are both located inside gaming jurisdiction 58. However only device 56 is located within geo-fence 57, which is established by the coverage areas of a plurality of base station 53. Thus, geo-fencing may be used to enable gaming via device 56 but disable or limit or control features of gaming via devices 54 and 55. Even though some gaming communication devices that are within the gaming jurisdiction 58, such as device 55, are not permitted access to the gaming system, the geo-fence 57 ensures that no gaming communication devices outside jurisdiction 58, such as device 54, are permitted access. Within the geo-fence 57, device 56 may use the location information as a variable input for a location-dependent gaming function.

Geo-fencing does not specify location. Rather, it ensures that a mobile station is within certain boundaries. For instance, geo-fencing may be used to ensure that a mobile station beyond state lines does not access the gaming system. Triangulation on the other hand specifies a pinpoint, or near-pinpoint, location. For example, as shown in FIG. 5, device 56 is triangulated between three of the base stations 53 to determine the location of device 56. Triangulation may be used to identify whether a device, such as a mobile station, is located in a specific spot where gambling is unauthorized (such as, for example, a school). Triangulation may also be used to determine the location of the device 56 within a permitted venue, to prove location dependent gaming features. Preferably, the location determination technology utilized in conjunction with the present embodiment meets the Federal Communication Commission's (FCC's) Phase 2 E911 requirements. Geological Institute Survey (GIS) mapping may also be utilized to compare identified coordinates of a gaming communication device with GIS map features or elements to determine whether a device is in an area not authorized for gaming. It should be noted that any type of location verification may be used such as triangulation, geo-fencing, global positioning satellite (GPS) technology, or any other type of location determining technology, which can be used to ensure, or provide an acceptable level of confidence, that the user is within an approved gaming area, and to provide an indication of where within an approved gaming area the user is located.

In another embodiment, location verification is accomplished using channel address checking or location verification using some other identifying number or piece of information indicative of which network or portion of a network is being accessed by the gaming communication device. Assuming the use of an identifying number for this purpose, then according to one method of location checking, as an example, a participant accesses the gaming system via a mobile telephone. The identifying number of the mobile telephone, or of the network component being accessed by the mobile telephone, identifies the caller's connection to the mobile network. The number is indicative of the fact that the caller is in a defined area and is on a certain mobile network. A client application may be resident on the mobile telephone to communicate this information via the network to the gaming service provider's server. In a related embodiment, the identifying number or information is passed from a first network provider to a second network provider. For example, a caller's home network may be that provided by the second provider, but the caller is roaming on a network (and in a jurisdiction) provided by the first provider. The first provider passes the identifying information through to the second provider to enable the second provider to determine whether the caller is in a defined area that does or does not allow the relevant gaming activity as a predicate, and to determine the user's location to provide location based services, such as location-dependent gaming functions where permitted. Preferably the gaming service provider either maintains, or has access to, a database that maps the various possible worldwide mobile network identifying numbers to geographic areas. The embodiment contemplates using any number or proxy that indicates a network, portion of a network, or network component, which is being connected with a mobile telephone. The identifying number may indicate one or more of a base station or group of base stations, a line, a channel, a trunk, a switch, a router, a repeater, etc. It is noted that while this discussion nominally focuses on a phone within a public network environment, this technique is also applicable to a proprietary or non-telephone device within a wireless network infrastructure, such as a WiFi network within a casino communicating with gaming devices.

In another embodiment, when the user connects his mobile telephone to the gaming server, the gaming server draws the network identifying information and communicates that information to the gaming service provider. The software resident on the gaming communication device may incorporate functionality that will, upon login or access by the user, determine the user's location (based at least in part on the identifying information) and send a message to the gaming service provider. The identifying number or information used to determine location may be country-specific, state-specific, town-specific, or specific to some other definable boundaries.

In connection with any of the location determination methods, the gaming system may periodically update the location determination information. This may be done, for example, during a gaming session, at pre-defined time intervals to ensure that movement of the gaming communication device to an unauthorized area is detected during play, and not just upon login or initial access.

Thus, depending on the location determination technology being used, the decision whether to permit or prohibit a gaming activity, and how permitted gaming activity is conducted, may be made at the gaming communication device, at the gaming server, or at any of the components of the telecommunication network being used to transmit information between the gaming communication device and the gaming server (such as at a base station, for example).

An embodiment of the private wireless network related to preventing gaming in unauthorized areas is the placement of sensors, such as Radio Frequency Identification (RFID) sensors on the gaming communication devices. The sensors may, for example, trigger alarms if users take the devices outside the approved gaming areas, or otherwise facilitate location-based features of the devices. Further, the devices may be "tethered" to immovable objects. Users might simply log in to such devices using their ID and password.

Figure 6:
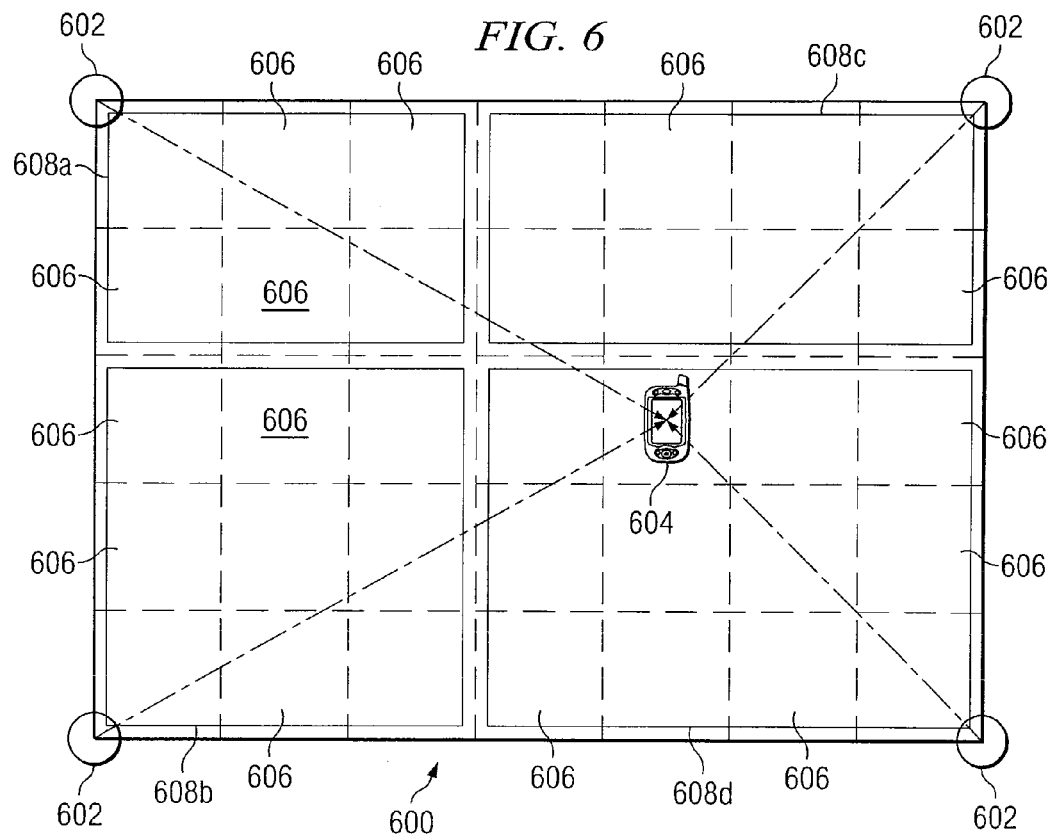
FIG. 6 illustrates a wireless gaming system having location determination in accordance with an embodiment.

In particular embodiments, the gaming system may also include the ability to determine the location of the gaming communication device within a larger property, such as a casino complex. This may allow certain functionalities of the device to be controlled based upon the location of the device within the property. For example, government regulations may prohibit using the device to gamble from the guest rooms of a casino complex. Therefore, particular embodiments may include the ability to determine the location of the device within the property and then disable the gambling functionality of the device from a guest room, or other area where gambling is prohibited. FIG. 6 illustrates an example of a wireless gaming system in which the location of a gaming communication device 604 may be determined in accordance with a particular embodiment.

As shown in FIG. 6, a wireless gaming system comprises a wireless network that at least partially covers casino complex 600 in which one or more gaming communication devices 604 may be used to participate in a variety of gaming activities. Preferably, the wireless network comprises at least three signal detection or transmission devices 602, although particular embodiments may include fewer or greater than three signal detection devices and still fall within the teachings of the embodiment. As shown in FIG. 6, the wireless network comprises four signal detection or transmission devices 602, each located at one corner of casino complex 600. In particular embodiments, these signal detection devices may comprise wireless access points, wireless routers, wireless base stations, satellites, or any other suitable signal detection or transmitting devices, or combination thereof. Furthermore, although signal detection or transmission devices 602 are illustrated as being located on the boundaries of casino complex 600, signal detection or transmission devices 602 may be located anywhere inside or outside of casino complex 600, provided the signal detection or transmission devices 602 are operable to transmit or receive signals with a gaming communication device 604 inside casino complex 600. In particular embodiments, signal detection or transmission devices 602 may also be used to transmit, as well as receive, signals to gaming communication device 604.

In particular embodiments, casino complex 600 may be divided into one or more zones 608, which represent different areas of the casino complex, such as the lobby, guest rooms, restaurants, shops, entertainment venues, virtual or real gambling parlors and pool areas. For example, as shown in FIG. 6, zone 608a may correspond to the casino lobby, zone 608b may correspond to guest rooms, zone 608c may correspond to restaurants, and zone 608d may correspond to the gaming floor of the casino. Each zone 608 may be further divided into one or more sub-zones 606, each specifying a particular location within zone 608. Typically, sub-zones 606 are arranged in a grid formation, each sub-zone 606 having a uniform size. In some embodiments, each sub-zone may comprise 9 square feet (i.e., 3 feet by 3 feet). In other embodiments, each sub-zone may comprise 100 square feet (i.e., 10 feet by 10 feet). Generally, the choice of the size of an area covered by a sub-zone may depend on administrator preferences, technical limitations of the wireless network, and governmental regulations, as well as other considerations. Sub-zones may also be overlapping, i.e., a zone may be 5 feet in diameter, with a location of a device statistically allocated to one sub-zone based on its probability of being within that zone as compared with neighboring sub-zones, even though the raw data reveals some ambiguity as to the precise location.

Particular embodiments may use this mapping of casino complex 600 into a plurality of zones 608 and sub-zones 606 to determine the location of gaming communication device 604 within the complex. Generally, these embodiments utilize the signal received by signal detection or transmitting devices 602 from gaming communication device 604 to determine the location of the device In particular embodiments, the location of gaming communication device 604 may be determined based upon the strength of the signal received by or from each signal detection or transmitting device 602 to or from device 604. In particular embodiments, this may be accomplished using a Received Signal Strength Indication (RSSI) value or any other suitable indication of signal strength. Generally, the closer a sub-zone 606 is to a signal detection or transmitting device 602, the stronger the signal the signal detection device will receive from a gaming communication device located in that sub-zone. Therefore, given a plurality of signal strength readings taken from different points in the casino complex (i.e., signal detection devices 602), these different signal strength readings may be used to determine the location of the device. A time-of-flight calculation alone, or in combination with the received signal strength, may also be used to determine a distance from each the signal detection or transmitting device 602 to or from device 604.

With this in mind, each sub-zone 606 of casino complex 600 may be associated with a reference set of signal strengths received by the signal detection devices from a device located in that particular sub-zone. Typically, these values are generated, and periodically recalibrated, by taking a reference reading from a gaming communication device located that sub-zone 606. After each sub-zone 606 is associated with a reference set of signal strengths, these reference signal strengths may be compared with the signal strengths received by the signal detection devices from a gaming communication device. Since each sub-zone has a set of signal strengths, this comparison may be used to identify the particular zone in which the gaming communication device is located.

In another embodiment, the location of gaming communication device 604 may be determined based upon an elapsed time between the transmission of the signal from device 604 and the receipt of the signal by each signal detection or transmitting device 602. In particular embodiments, this elapsed time may be determined based on a Time Difference of Arrival (TDOA), or any other suitable technology. As before in the case of signal strengths, each sub-zone 606 may be associated with a predetermined, or reference, set of elapsed times from transmission to receipt of a signal from or to a gaming communication device. This set of elapsed times will be different for each sub-zone of the casino complex, as the time it takes a signal to reach each signal detection device will depend on the proximity of the sub-zone to each base station. By comparing the time from transmission to receipt of a signal received by the signal detection devices from a gaming communication device, the sub-zone in which the device is located may be determined.

Once the location of the gaming communication device has been determined, particular embodiments may then enable and/or disable, or control particular functions of the device based on this determination. For example, as mentioned previously, particular embodiments may disable the gaming communication device's gambling functionality from a user's guest room, while still allowing the user to use other device functions, such as purchasing merchandise or services, or buying tickets to an entertainment event. Once the user leaves his or her guest room, the gambling functionality of the gaming communication device may be enabled, and optionally location-dependent within the permitted areas. Similarly, particular embodiments may prevent the gaming communication device from being used to make financial transactions from the casino floor. Once the user leaves the casino floor, such functionality may be enabled. Similarly, other functionalities of the gaming communication device may be enabled or disabled or controlled based upon the location of the device within the property in accordance with various embodiments.

In particular embodiments, the various functionalities of the gaming communication device may be controlled or influenced based upon the zone 608 in which the device is located. In such an embodiment, each zone 608 of the casino complex may be associated with a set of allowed activities and/or parameters to be used as inputs in a gaming function. For example, the "lobby" zone 608a of the casino complex may have all activities allowed, with a "lobby"-specific gaming motif, while the "guest room" zone 608b of the property may have all activities allowed except gambling. Based upon the gaming communication device's location, the functionality of the gaming communication device may be limited to the set of allowed activities for the zone in which the device is located, and of the allowed activities, some or all may be controlled using the location as a relevant input to the gaming function. As the gaming communication device travels from zone to zone, or sub-zone to sub-zone, the location of the device may be re-determined, and the functionality of the device may be updated to reflect the location-specific parameters for the zone or sub-zone in which the device is now located.

Particular embodiments may also use the location determination to send location-specific information to the gaming communication device. For example, a reminder that an entertainment event, the user has tickets to, is about to begin may be sent to the user's device if the device (and therefore the user) is located in a different part of the casino complex.

In another embodiment, a user may be alerted that the user's favorite dealer is on the casino floor if the user is located in his or her guest room.

In some embodiments, the location of the gaming communication device may be used to deliver goods and services purchased or ordered by the user of the device. For example, in particular embodiments, the user may purchase food and beverages using the device. The location of the device may then be used to deliver the food and beverages to the user, even if the user relocates to another sub-zone after placing his or her order.

The determination of the gaming communication device's location may also be used to provide the user with directions to another part of the casino complex. For example, a user that is located on the casino floor that wishes to go to a specific restaurant within the complex may be given direction based upon his or her location. These directions may then be updated as the user progresses towards his or her desired location. In the event the user gets off-course, the location determination, which may be updated during the user's travel, may be used to alert the user they have gotten off-course and then plot a new course to the desired destination.

In like manner to known automotive navigation systems, the user may also be guided away from congested areas. A number of ways of determining congestion are available, ranging for example from a density of the portable gaming devices themselves within a zone or sub-zone, to cameras. Likewise, a user may wish to avoid meeting another person, and therefore may be guided to avoid meeting that person incidentally. On the other hand, users may be guided to common areas to meet people.

An example method of using a wireless gaming system to determine the location of a gaming communication device within a casino complex and then control functionality based on the location of the device is shown in FIG. 7. FIG. 7 illustrates flowchart 700, which describes a method of location determination in accordance with a particular embodiment. Flowchart 700 commences in step 702. After flowchart 700 begins, the wireless network is calibrated in step 704. Generally, this entails establishing a set of reference values used to identify each sub-zone of the casino complex or other property. It is noted that, in some embodiments, this step may be dispensed with, particularly where the location system intrinsically provides accurate results. In particular embodiments, these values may include the signal strengths received by or from each signal detection or transmitting device from or to a gaming communication device located in that sub-zone. In other embodiments, these values may include the elapsed time from transmission to receipt of a signal by the signal detection devices from or to a gaming communication device located in the sub-zone. Moreover, in additional embodiments, these reference values include a combination of signal strengths and elapsed times from transmission to receipt of a signal.

Once the wireless network is calibrated (as necessary), with a set of reference values associated with each sub-zone of the property, one or more gaming communication devices may use the wireless network to transmit and receive information to and from one or more gaming servers. At step 706, the plurality of signal detection devices that comprise the wireless network receive a signal from a gaming communication device. The location of this gaming communication device is determined at step 708. In particular embodiments, this is accomplished by determining the strength of the signal received by each signal detection device and comparing this set of signal strengths to a reference set of signal strengths determined during calibration, or based on a linear model. In other embodiments, the location of the gaming communication device may be determined by determining the time that has elapsed between the transmission of the signal from the gaming communication device and its receipt by each signal detection device. This set of elapsed times may then be compared to a reference set of elapsed times between transmission and receipt of a signal for each zone that was determined during calibration or to a linear model. Based upon the linear triangulation, or comparison of the reference values determined during calibration, and the signal received by each signal detection device, the sub-zone, and therefore zone, in which the gaming communication device is located, may be determined.

At step 710, different functionalities of the gaming communication device may be controlled or influenced based upon the zone or sub-zone in which the device is located. In particular embodiments, each zone or sub-zone is associated with a set of parameters for game play. For example, a portion of a gaming floor may have an old time western saloon motif. When in that zone, the gaming device displays western-style graphics, and the games may themselves include theme appropriate graphics and game rules. The casino operator may provide an incentive to players to come to this portion of the floor, for example by providing an extra win opportunity in a slot machine implementation, or an extra wild card in a poker game to provide increased odds of winning, or an advantageous "comp point" determining formula. Likewise, as the user relocates to other zones or sub-zones within the casino in which gambling is permitted, the graphic presentation of the device and/or games presented may change correspondingly. Special rules may apply to table games, as deemed appropriate by management and permitted by law. Other functionalities may be controlled as described above in regard to FIG. 6.

Since gaming communication devices may be mobile in accordance with particular embodiments, particular embodiments periodically re-determine the position of the device. This allows the user to use the gaming communication device while carrying the device throughout the property and have its functionality updated accordingly. Therefore, at step 712, a determination is made whether to repeat the location determination. This may be performed automatically at set intervals or upon the occurrence of some event, such as a request from the user or the receipt of an additional signal from the device. On the other hand, the infrastructure may automatically determine device location continuously, or during every communication. If the location is to be re-determined, flowchart 700 returns to step 706, where another signal is received from the communication device, and its location and functionality is updated accordingly. If, however, the location, the flowchart 700 simply terminates at step 714.

By determining the location of the gaming communication device within the property, particular embodiments allow the functionality of the device to be tailored to the device's location. Furthermore, location-specific or directional information may be transmitted to the gaming communication device based upon the location of the device. This allows for a more customizable user experience, as well as allowing gaming administrators to tailor the functionality of the device based upon the device's location and any applicable governmental regulations.

FIG. 8 illustrates a method of operation of a gaming communication device in accordance with a particular embodiment. As previously, software is preferably loaded on a gaming communication device and is operable to receive input data for gaming. The input data may originate at associated gaming software resident on the gaming server, or it may be input by the user of the gaming communication device. The software on the device is operable to present a representation of a gaming environment. This can include, among other things, a representation of a table game such as a blackjack table or a slot machine. Other examples of the representation of a gaming environment include graphical representations of any of the other applications described herein. Preferably, this software receives as input parameters a position of the device, which is used in conjunction with a predetermined algorithm or set of rules to influence the game play or other functionality.

In the example method shown in FIG. 8, in a first step 802, the gaming communication device is activated. This may take place as a function of turning on a phone, PDA, or other communication device as described elsewhere herein. Preferably, activation comprises connecting the gaming communication device to a private data network. Part of the activation includes logging-in at a prompt. This may be considered as a first level of authentication of a user of the gaming communication device. A second level of user authentication comprises authentication of the gaming communication device itself. This may occur, for example, by authentication of a mobile station by a mobile carrier. A third level of user identification may comprise biometrics. Various examples of biometrics may include, but are not limited to, fingerprint identification, photo identification, retina scanning, voice print matching, etc.

In a next step 804, the user is presented with the gaming environment. The gaming environment may be presented in various stages. For instance, in a first stage, the gaming environment may comprise a casino lobby where the user is presented with certain gaming options including, for example, table games, slots, sports book, video poker, and a casino cashier. In a subsequent stage, the user may be presented with optional instances of the type of activity selected from the casino lobby. The optional instances may, for example, inform a user that these may be selected by physically moving to the represented location, or that the graphics and embodiments of the game change in dependence on the user's location.

In a next step 806, the user selects an activity, such as a particular casino table game, for example by manually selecting the activity through the user interface presented on the device. In step 808, the user is presented with one or more options related to the selected activity, which may be selected manually, or, where appropriate, by physically relocating to a zone or sub-zone within the venue. In step 810, the user selects an available option. For instance, at this point, the user might place a wager, draw a card, place a bet on a certain box office performance over/under amount for a given movie, etc. The options for user input are myriad. In step 812, the software resident on the gaming communication device accepts the option input by the user and transmits the input data to the software resident at the gaming server, which also receives or determines the user's location. In step 814, the gaming server software acts on the input data, including the user's location, and thus provides a location-dependent result. The activities may also include non-location dependent options, for example, to select a restaurant or restaurant menu item, select a news source or a news story, place a buy or sell order on a financial exchange.

Actions at this point may include, without limitation, determining an outcome and/or amount, accessing another server and/or software application, retrieving information, preparing a response to the user, etc. The action of determining an outcome and/or amount might take place, for example, if the user is using the device to place wagers in connection with a gambling activity. For certain gambling activities, such as a table game or slot machine, a random number generator may be incorporated to determine the outcome (i.e., whether the user won or lost) and the gaming server software would also determine an amount won or lost based on the amount wagered and any applicable odds, any or all of which might be dependent on the user's location at that time. The action of accessing another server and/or software application might occur, for example, in the event the user is engaging in a services activity such as accessing news services, making reservations and placing food and beverage orders at a restaurant, or making a retail purchase. The action of retrieving information might occur when the gaming server software is prompted to access another server for the purpose of retrieving a certain type of information requested by the user.

Preferably, the gaming server software prepares a response to the user's input data and location information and in step 816. In step 818, the user optionally acknowledges the response. For example, in the case of gambling, the user might acknowledge that he won a hand of blackjack because the dealer busted and that his payout was $100 based on a $50 bet at even odds. In step 820, the user logs out.

In the situation where the user is gambling, after the series of steps described in connection with FIG. 8, (or a subset or modified series of steps), the user physically enters a casino and goes to a casino cashier for payout and/or settlement (which can include, for example, extensions of credit or advance deposits). In one embodiment, there is a waiting period (e.g., twenty-four hours) before the user can collect winnings. The purpose of the waiting period is to allow time for fraud monitoring. The waiting period may depend on the amount of the balance. For example, if the user is owed less than $5,000 the waiting period may be twelve hours. If the user is owed between $5,000 and $10,000 the waiting period may be twenty-four hours. If the user is owed more than $10,000 the waiting period may be forty-eight hours.

The duration of activation of the gaming communication device, the duration of a particular session, and/or the duration of a particular activity may be controlled according to any number of different parameters. For example, the duration may be based on a predetermined amount of time or period of time. Activation of the gaming communication device may terminate upon the expiration of a predetermined time period. As another example, an activity may only be permitted until the occurrence of a particular time of day. According to an alternative, an administrator, or another party to a transaction within any of the various activities, may determine the time period or amount of time. According to yet another alternative, the duration may end upon the occurrence of an event such as the user entering or leaving a particular location. The duration of activation may be dynamically determined based on a period of non-use. In other words, after a predetermined time without being used, the device may "time out" and be deactivated. The period of time, or amount of time, may be cumulatively determined. For example, an activity may only be permitted for a period of five hours, collectively. Time counting toward the five hours might stop and start depending upon the location of the user. As another example, an activity might only be permitted so long as the user does not enter or leave a particular location for longer than a predetermined period of time.

Similarly, activation of the gaming communication device and/or the ability for a user to engage in a particular activity may only be permitted during a specified time of day, or for a particular period of time prior to an event, or for a particular period of time after notification to the user. Also, activation and/or access may be controlled based upon the location of the user. For example, if a user is in a particular casino in which a particular show will take place that evening, the user might be notified that tickets to the show are available for a specified period of time prior to the show. The user might only be permitted to engage in the activity of purchasing tickets for the show if the user is in the casino and during the specified period of time prior to the show. For example, the user might only be able to purchase tickets while in the casino and up to five minutes before the start time of the show. Similarly, the activation of the device may be restricted based on the location of the user and a corresponding period of time. For example, if a user is in a location where a show is occurring, or is going to occur, the device may be deactivated (either automatically, or by a party other than the user) during a period beginning five minutes prior to the show and ending five minutes after the end of the show.

According to another alternative, the duration or enablement of one activity might be determined by the participation of the user in another activity. For example, a user might be allowed to make dinner reservations at a popular restaurant if the user has been gambling enough at a given casino. In this way, bonuses or comps may be determined or managed based on the activity of the user via the gaming communication device. In like manner, the location within the casino may be a factor in determining bonuses or comps.

Figure 9:
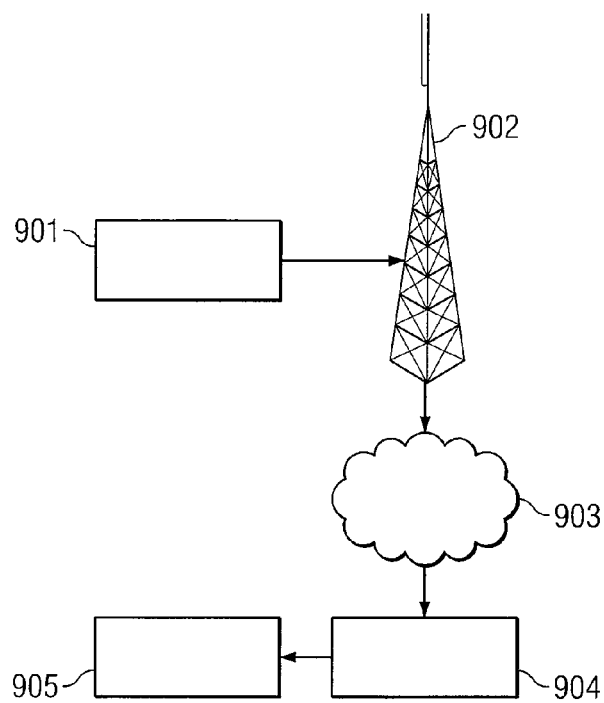
FIG. 9 depicts a wireless gaming system showing a communication path in accordance with an embodiment.

Preferably, data is transmitted back and forth during the gaming activities between the gaming communication device and a server controlled by the gaming service provider. An example of the path of communication is shown in FIG. 9. Gaming data, such as a wager placed by the user, is transmitted from gaming communication device 901 to a base station 902 (or a transmitter in the case of a private wireless network such as a WiFi or WiMax network). Base station 902 routes the data through network 903 to a hub or gateway 904, which in turn routes the data to a gaming server 905 operated by a gaming service provider. Preferably, the communication from gaming communication device 901 to the network 903 comprises wireless communication. This may be any type of known wireless communication or any type of wireless communication available in the future. Examples of acceptable wireless communication protocols include CDMA, TDMA, FDMA, GSM, and GPRS.

Preferably, the communication from the network 903 to the gateway 904 and to the server 905 is conducted over secure land lines. FIG. 9 is an example communication network only and the embodiment should be understood to cover other networks in which data may be transmitted from gaming communication device 901 to server 905. Preferably, data in response to data being transmitted from gaming communication device 901 to server 905 is transmitted back to gaming communication device 901 along a path essentially opposite to the path of the first transmission. It should be noted that in at least certain embodiments of the methods and systems described herein, a user is not actually playing a game on the gaming communication device. Rather, the user is actually playing the game on the server controlled by the gaming service provider, which may be located within a casino.

With respect to payment and/or receipt of winnings and losses, one possible approach is as follows. Upon check-in at a casino hotel, a hotel representative may query a guest as to whether the guest wants access to a gaming communication device. If the guest does want such access, the hotel representative may provide the guest with a gaming communication device in exchange for a credit-card type deposit or other deposit. The guest then deposits money into an account for wireless gaming. The guest's account balance information is loaded onto the guest's account file, which is preferably maintained on the gaming server. The user may load money into his gaming account by establishing a credit account, for example, at a casino cashier and/or by paying cash to the casino cashier. Many other alternatives exist and this process is an example only. Guest accounts or gaming communication devices may be preloaded with funds. Funds may be deposited during a gaming session. This may occur, for example, if a user selected a casino cashier activity from the gaming environment and instructed the cashier to add funds to the account. The finance subsystem may also utilize account card technology (such as ATM cards, credit cards, stored value cards, gift cards, etc) in order to conduct financial transactions associated with a user's account. Moreover, the user may receive or make payments remotely, by way of inputting instructions via the gaming communication device or by another remote device such as an automatic teller machine (ATM), which is in electronic communication with the gaming server or other server operated by the casino, hotel, gaming service provider or other entity involved in the gaming activities. For example, a user might remotely (via the gaming communication device) place an order at a restaurant. Then, the user might make advance payment for the meal at an ATM-type machine which is operable to receive instructions corresponding to the financial transaction requirements of the activity of ordering food.

An embodiment includes establishing an electronic record of the gaming transactions undertaken by a user and location thereof Preferably, this is accomplished by recording the received location information and utilization of a keystroke log, which is an electronic record of all keystrokes made by the user. Utilization of a keystroke log in this context allows for unprecedented monitoring of a user's gaming activity, and auditing thereof In the event of a dispute, one may refer to the keystroke log and readily determine whether, in fact, a user placed a particular wager, for example.

An additional possible embodiment of the electronic record is to allow a gaming control board or other regulatory authority, access to the electronic record in a direct manner in order to conduct periodic independent monitoring of the gaming activities conducted over the system. Another possible embodiment is to allow policing against rigged machines. For instance, it is possible that the gaming control board (or other regulatory authority) could obtain a gaming communication device and compare their test results over time against records in the electronic record database (e.g., by comparing the results shown in the keystroke log). This essentially comprises electronic access for testing.

Figure 10:
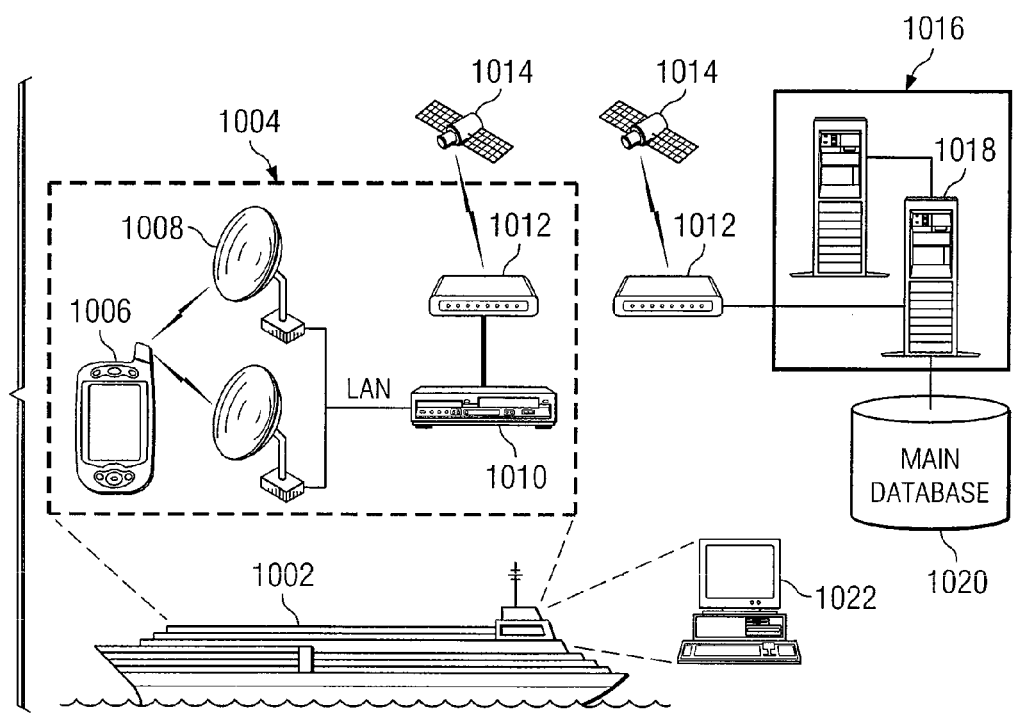
FIG. 10 illustrates a ship-based gaming system in accordance with an embodiment.

In another embodiment, as shown in FIG. 10, a ship-based gaming system is provided. The system preferably comprises passenger vessel 1002, such as a cruise liner for example. The system includes one or more gaming communication devices 1006 connected to a communication network. The network shown in FIG. 10 comprises a mobile network with base stations 1008 connected via a LAN to a base station controller (BSC) 1010. Each base station 1008 has a predetermined location, and thus communication through that base station 1008 generally defines a zone. Triangulation between multiple available base stations 1008 allows determination of a respective sub-zone in which the gaming communication device 1006 is located.

In one embodiment, the gaming system is completely hosted on board the ship. In another embodiment, the ship is in communication with a remote system for monitoring, accounting, and control, for example. In this case, BSC 1010 is connected via a T1 interface to a first Very Small Aperture Terminal (VSAT) modem 1012, which is in communication with a first satellite 1014. First satellite 1014 is operable to transmit and receive signals from second satellite 1014, which is in communication with second VSAT modem 1012. Second VSAT modem 1012 is in communication with a gaming server 1018 located at gaming service provider 1016. Gaming server 1018 is coupled to gaming database 1020. Again, the network configuration depicted in FIG. 10 is for example purposes only, and other configurations are within the scope of the embodiment. An on-board back office 1022 is preferably provided. Data is communicated by the on-board VSAT modem and transmitter to the first satellite for relay to the second (preferably land-based) VSAT receiver and modem. The data is then communicated to a server and/or centralized database via a mobile station controller (not shown).

A corresponding business model involves the gaming service provider contracting with a cruise line, which agrees to allow the gaming service provider to provide coverage throughout the cruise line's ship(s), by using repeaters for example. The gaming service provider may provide a private wireless network, in which case any revenue generated from use of or access to the private wireless network, and revenue from gaming activities, may be allocated among all or any subset of the cruise line and the gaming service provider. Alternatively, the gaming service provider may contract with a mobile carrier and a satellite provider, in which case revenue from the mobile calls, and revenue from gaming activities, may be allocated among all or any subset of the cruise line, the mobile carrier and the gaming service provider.

There are several scenarios for a user's activity relative to transactions conducted over the gaming system. In one example scenario the user is in a fixed, but remote, location from the gaming server, which may be located on the premises of a casino. This may be include, for instance, a situation in which the gaming communication device is a kiosk or some other communication device which is in a fixed position or which is tethered to a fixed position so that the gaming communication device cannot be moved beyond a certain area. In another example scenario, the user starts a gaming transaction at a first location and ends the transaction at a second location different from the first location. In another example scenario, the user is mobile during a single gaming transaction. In another example scenario, the user is mobile within a first area then (during the gaming transaction) the user moves outside the first area, through a second area, to a third area.

In an alternative embodiment, the gaming system may be configured to operate as a "curb-to-curb" gaming system. In such a system, a communication path may be established between the device and a particular server, based upon whether the user is in a location corresponding to that particular server. For example, the user might enter a first casino, or an authorized area associated with the first casino, and thereby activate the establishment of a communication path between the device and a server located at and/or controlled by the first casino. While the user is on the premises of the first casino, the user might be able to participate in activities, such as playing blackjack, at the first casino. Then, if the user leaves the first casino, the gaming system might be configured to terminate the first communication path (i.e., between the device and the first casino's server), or otherwise deactivate the device and/or terminate the user's ability to use the device to participate in activities associated with the first casino. When the user enters a second casino, or an authorized area associated with the second casino, a second communication path (e.g., between the device and a second server located at or controlled by the second casino) may be established. Thus, the user would now be able to play blackjack (or engage in other activities) at the second casino, rather than the first casino. Within each casino, respective location-dependent functionality may be implemented.

As another example, a particular casino is often related to other casinos within a jurisdiction or specified area. Under such a scenario, if a user entered any of the related casinos, then the appropriate communication path or paths could be established between the gaming communication device and one or more of the casinos in the group of related casinos, thereby enabling the user to play casino games (or engage in other activities) at the one or more casinos in the group of related casinos. Depending on regulatory requirements, the preferred configuration might be to establish a communication path with a server at a particular casino within the group at which the user wants to play. Then, a different communication path could be established at a subsequent casino if the user wants to play at another casino. Under certain circumstances, and again depending on regulatory requirements, some information associated with user activity might be maintained at a centralized server accessible by more than one casino within the group.

In another example embodiment, the gaming system may be used to enable gaming activities involving multiple wireless users who interact with one another. The association of different users may be based on prearranged social groups, location of the various users, or other criteria. For instance, the system may enable a table game (such as blackjack) in which a first user and a second user are conducting gaming transactions on the same table and in which options selected by the first user directly impact outcomes and options relative to the second user. Preferably, the gaming environment presented on the gaming communication devices of both the first and second users will indicate the existence and activity of the other respective user. Another example of multiple users interacting on the gaming system is the provision of a poker game in which users place bets against one another instead of, or in addition to, placing bets against the house. Another example of interaction between users is when a first user makes restaurant reservations or purchases event tickets, thereby reducing the options available to the second user, although this interaction will generally be indirect. On the other hand, the terminals may support an auction system, in which users may sell tickets, reservations, and the like, to a highest bidder, thereby facilitating a direct interaction between users. To the extent encouraged or permitted by the venue, financial accounting may be conducted using the terminals, in some cases with the "house" taking a commission on the proceeds.

Preferably, the gaming service provider provides at least the following functions. First the gaming service provider provides and controls the one or more gaming servers. These servers may be physically located within the confines of the gaming service provider or may exist at a remote location. As mentioned, the gaming servers may also be located at or near a games provider such as a casino, casino hotel, racino, cruise ship, race track, etc. The gaming service provider may also provide monitoring services such as location and/or transaction monitoring and key stroke logging services. The gaming service provider may also provide data management and security services. These services are not intended to be exhaustive and the gaming service provider may provide other services which facilitate the gaming process.

It should be noted that the embodiment can be implemented in connection with any gaming environment or an environment for any other activity, which may be conducted electronically. The embodiment is not limited to Nevada or any other particular gaming jurisdiction. For instance, the embodiment can be employed in connection with casinos in Atlantic City, N.J., international jurisdictions, Native American gaming facilities, and "racinos" which are race tracks that also have slot machines, video lottery terminals, or other gambling devices. For example, in connection with "racinos," the embodiment might be used by participants who wish to play slot machine games while they are viewing race horses in the paddock area. This might be desirable in the event that the slot machine area does not allow smoking and a participant wishes to gamble from an outdoor smoking area. Alternatively, the slot machine area might permit smoking and the gambler wishes to play the slot machines from an area where he or she can avoid breathing second-hand smoke. Numerous other scenarios can be envisioned in which the gaming participant can use the embodiment to participate in remote gaming, while enjoying some other primary activity in a location remote from the gaming facility. Further, the embodiment is not limited to gaming, but can include other applications, such as trading financial instruments, and wagering on (or simply predicting, for fun) other types of events, such as elections, award events, or any other activity.

Another example embodiment involves the application of one or more of the methods and systems described herein to the activity of conducting financial transactions. Thus, the gaming communication device may be configured to enable a user to conduct such financial transactions, which may include, without limitation, any transaction involving a financial institution, such as banking, trading securities, or managing 401K or other investment fund assets. Preferably, a communication path would be established between the user and any of the servers or other computers necessary to conduct the financial transaction. As with certain other embodiments the ability to engage in this activity may be controlled by one or more parameters including location and/or identity verification and time or duration limits. Typically, such functions are not location dependent, in that the user's location is not generally a relevant input to a financial market transaction, though as discussed below, it may be a predicate. However, to the extent that fraud is a possibility, an recording of the user's location from which a trade or transaction is made may assist in authenticating and/or verifying a transaction.

Conducting financial transactions may be one of the activities presented to the user of the gaming communication device. Any of the possible financial transactions might be presented as sub-activities. As an example, a user might want to trade securities listed on a particular exchange. Regulations might require the trader to be located within a certain jurisdiction to execute trades on the exchange. The exchange might have its own rules and could require that the trader be located on the premises. With the location verification techniques described elsewhere herein, the particular financial transaction activity might only be enabled if the user is located in a particular geographic area, for example.

As a related feature, the system may be configured to provide a credit verification feature, according to which a user's creditworthiness may be checked by a party to a transaction, or by which the user might apply for credit. For example, if a user wants to purchase $10,000 worth of a particular stock, then a communication path might be established between the user and a server located at and/or controlled by an exchange upon which the stock is being traded. An additional communication path might be established between the exchange server and a server of an account manager that manages the user's account. These communication paths would enable the basic transaction—that of the user purchasing the stock. Yet another communication path, however, might be established between a seller's server, the exchange server, and/or the account manager server and a server located at and/or controlled by a credit agency. This path would enable an interested party to the transaction to check and/or approve the user's credit to prior enabling the transaction.

According to one embodiment, the gaming communication device supports a "Push to talk" feature. In order to enable this feature, the device is configured to be capable of facilitating a "Push to Talk" protocol, whereby the device behaves like a walkie-talkie. Thus, the device may include any suitable program or application that enables the Push to Talk feature. As used herein, the phrase "Push to Talk" includes any protocol that allows for a direct connection feature for an end user. Included are all such protocols (e.g. Instant Talk, Fastchat, etc.) within the broad rubric of "Push to Talk" including those that provide wide-area, instantaneous contact. Because Push to Talk effectively turns the handheld device into a walkie-talkie, it not only successfully enables end users to send voice messages, it also enables immediate data texts (commonly referred to as "direct messaging"). This feature may be used in known manner, or advantageously to facilitate gaming applications. For example, in an application where the user of the gaming communication device is playing blackjack from an authorized area outside the casino gaming area, the Push to Trade feature would enable the user to participate audibly in the blackjack game actually taking place within the casino gaming area. The Push to Talk technology would allow the user to immediately and virtually "sit down" at an actual blackjack table without the delay caused by the conventional setup and tear down process of certain traditional telecommunication protocols. Also, once the user is participating in the game, the user can communicate orally with the dealer, or other players that are physically at the table, without the latency issues of certain mobile telecommunication systems.

In at least one embodiment, jurisdictional controls, which limit gaming to approved geographical areas, are provided. The embodiment may also include an age/identity verification feature. This can be accomplished through any applicable technique including retina scanning, finger print identification, voice print matching, or other biometrics. Identity verification can also be accomplished by having a customer take a picture of himself (e.g., by use of a digital picture phone) and transmitting the picture to the gaming service provider for comparison to a stored picture of the pre-approved user. Identity verification can also be accomplished by way of comparison of participant provided data to stored data, and execution of electronic agreements or contracts by the participant. Identity verification can also be accomplished by monitoring a keystroke characteristic (e.g., rhythm, patterns, or cadence) of the user, or any other method in which a parameter associated with the user can be observed. The embodiment may also provide for the logging of keystrokes. In at least one embodiment, all communications are accomplished without accessing the Internet.

Mobile, remote gaming supporting location-dependent functionality is desirable for many reasons, some of which have already been described. The embodiment may allow supplementation of existing in-house gaming revenue by allowing bettors to place bets while enjoying other leisure activities such as golf, swimming, dining and shows, and may allow a venue to optimize its floor-space and/or revenues and/or profits, or other value function by providing incentives to users for optimal distribution of players. The embodiment may complement the new coinless wagering environment as bettors can play their favorite games outside the casino. The embodiment provides a high-speed, reliable, accurate, and secure mobile gaming environment that complies with regulatory requirements for identification and location verification of the bettor with the ability to generate key stroke logs. Based on geographic coding, the mobile gaming environment may be tailored to location and/or context of use. The embodiment may restrict unauthorized usage from a geographic perspective and is capable of implementation using location verification technology (e.g., geo-fencing) to conform the gaming activities to legal parameters.

Consumers may benefit from an increased choice and variety of gaming environments. Consumers will be able to bet in whatever surroundings they prefer, benefiting from the knowledge that the product is regulated, fair and secure while enjoying the gaming experience at the speed they choose without external influences, such as that which might occur within the in-house casino environment. The gaming businesses can use the embodiment to increase their revenue base through a new, regulated, mobile, remote channel. Customers wanting to be entertained during downtime or outside a casino will be able to play games on their gaming communication device and customers intimidated by a traditional casino environment will be able to play in private. The gaming jurisdictions may benefit from an increase in gaming and ancillary revenue growth because customers will have a more enjoyable experience.

The embodiment may also be used to deliver content at an increased speed compared to traditional telecommunications systems. The content may include, for example, live reports, entertainment, news, promotions and advertising. Such information services may also be location-dependent, and particular, location dependent advertising is a significant opportunity, especially where the advertising is embedded in the gaming function, rather than a detraction from it.

As mentioned, the embodiment provides a mobile gaming environment that complies with regulatory requirements for identification and location verification of the bettor. Moreover, the system is preferably designed to be compliant with applicable laws and regulations. The software may be self-verifying, and thus require operative accurate location detection for operation, thus prevent misuse of the software while circumventing the location dependence features.

The systems and methods described herein may also be used to deliver and/or access "Rich Media" content such as, for example, sports video (live or nearly live) and audio commentary. Such may often only be distributed within specific jurisdictions. Therefore, the distribution may benefit from the embodiments discussed herein, particularly location verification embodiments, such as geofencing.

The gaming system and methods described herein may permit, among other things, pari-mutuel wagering, sports betting, and dissemination of news and other content. The embodiment also enables a casino or other gaming provider to advertise ancillary services such as shows, bars, and restaurants. The embodiment also enables remote reservations and purchases in connection with such services.

According to an embodiment, the gaming system provides for the dissemination of real-time odds to users accessing the system.

In another embodiment, an outcome in one transaction can trigger the presentation to the user of options for a second transaction. For example, if a user wins a predetermined amount of money playing blackjack, the user might be presented with an option to purchase retail items at a casino store or to make reservations for certain services at a club. As another example, if a user uses the system to purchase show tickets, the user might be offered to make reservations at one of several restaurants within a certain proximity to the show.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

General Concepts

I. Terms

The term "product" means any machine, manufacture and/or composition of matter, unless expressly specified otherwise. The term "process" means any process, algorithm, method or the like, unless expressly specified otherwise. Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise. The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise. The term "variation" of an invention means an embodiment of the invention, unless expressly specified otherwise. A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise. The terms "a", "an" and "the" mean "one or more", unless expressly specified otherwise. The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of each of" the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on".

The term "represent" and like terms are not exclusive, unless expressly specified otherwise. For example, the term "represents" do not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g., 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

II. Determining

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing and the like.

The term "determining" does not imply that mathematical processing must be performed, and does not imply that numerical methods must be used, and does not imply that an algorithm or process is used.

The term "determining" does not imply that any particular device must be used. For example, a computer need not necessarily perform the determining.

III. Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device, article or other product is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

IV. Disclosed Examples and Terminology Are Not Limiting

Neither the Title (set forth at the beginning of the first page of the present application) nor the Abstract (set forth at the end of the present application) is to be taken as limiting in any way as the scope of the disclosed invention(s). An Abstract has been included in this application merely because an Abstract of not more than 150 words is required under 37 C.F.R. §1.72(b).

The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

All words in every claim have the broadest scope of meaning they would have been given by a person of ordinary skill in the art as of the priority date. No term used in any claim is specially defined or limited by this application except where expressly so stated either in this specification or in a claim.

The preambles of the claims that follow recite purposes, benefits and possible uses of the claimed invention only and do not limit the claimed invention.

The present disclosure is not a literal description of all embodiments of the invention(s). Also, the present disclosure is not a listing of features of the invention(s) which must be present in all embodiments.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

V. Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions.

A "processor" means one or more microprocessors, central processing units (CPUs), computing devices, microcontrollers, digital signal processors, or like devices or any combination thereof.

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth™, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

VI. Continuing Applications

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants may intend to file additional applications to pursue patents for subject matter that has been disclosed and enabled but not claimed in the present application.

VII. 35 U.S.C. §112 paragraph 6

In a claim, a limitation of the claim which includes the phrase "means for" or the phrase "step for" means that 35 U.S.C. §112, paragraph 6, applies to that limitation.

In a claim, a limitation of the claim which does not include the phrase "means for" or the phrase "step for" means that 35 U.S.C. §112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. §112, paragraph 6, applies to that step(s).

With respect to a means or a step for performing a specified function in accordance with 35 U.S.C. §112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. §112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function hat is a method, one structure for performing this method includes a computing device (e.g., a general purpose computer) that is programmed and/or configured with appropriate hardware to perform that function.

Also includes a computing device (e.g., a general purpose computer) that is programmed and/or configured with appropriate hardware to perform that function via other algorithms as would be understood by one of ordinary skill in the art.

VIII. Incorporation By Reference

Any patent, patent application or other document referred to herein is incorporated by reference into this patent application as part of the present disclosure, but only for purposes of written description and enablement, and should in no way be used to limit, define, or otherwise construe the terms of the present application where the present application, without incorporating that material, would not have failed to provide an ascertainable meaning, but rather would have provided a meaning to such term.

What is claimed is:

1. An apparatus, comprising:
   at least one processor; and
   a memory that stores instructions which, when executed by the at least one processor, direct the at least one processor to:
   determine a plurality of selectable betting parameters for a wager in a game,
   each selectable betting parameter comprising a game parameter that affects an outcome of a bet by a first user in the game,
   the plurality of selectable betting parameters comprising at least a first selectable betting parameter and a second selectable betting parameter,
   the game being played by at least one user using a corresponding at least one wireless gaming terminal associated with each of the at least one user,
   each of the at least one wireless gaming terminal having a wireless network interface operable to transmit and receive gaming information, the at least one user comprising the first user, in which each wireless gaming terminal is in communication with a location determination system that determines a location of the wireless gaming terminal, each wireless gaming terminal further having a user interface for interacting with a corresponding user of the wireless gaming terminal to implement a game, wherein the game depends on the determined location;

determine a plurality of different locations in a gaming area,
each location corresponding to at least one of the plurality of selectable betting parameters,
the plurality of locations comprising at least a first location corresponding to the first betting parameter and a second location corresponding to the second betting parameter,
in which the first location is different from the second location,
in which the first selectable betting parameter is different from the second selectable betting parameter such that a selection of the first selectable betting parameter would cause a different result for the bet than a selection of the second selectable betting parameter;

during the game, determine a location of at least one wireless gaming terminal corresponding to each of the at least one user in the game, in which the act of determining the location of the at least one wireless gaming terminal comprises determining a location of the first user by determining a location of a first wireless gaming terminal of the first user;

determine at least one of the plurality of selectable betting parameters associated with the at least one user in the game based on the determined location of the at least one user, in which the act of determining at least one of the plurality of selectable betting parameters comprises determining at least one of the plurality of selectable betting parameters associated with the first user based on the determined location of the first user; and determine the outcome of the bet based at least in part on the determined at least one betting parameter in accordance with one or more predetermined rules of the game.

2. The apparatus of claim 1, wherein the location determination system comprises at least one of a network based location system and a satellite based location system.

3. The apparatus of claim 1, wherein said wireless network interface communicates with at least one wireless gaming terminal in at least one of an unlicensed radio frequency band and a licensed radio frequency band.

4. The apparatus of claim 1, wherein said user gaming system comprises a biometric user identification system.

5. The apparatus of claim 1, wherein said location determining system comprises at least one of an RF-ID tag and a system using a short range modulated magnetic field communication protocol.

6. The apparatus of claim 1, in which the instructions, when executed by the at least one processor, further direct the at least one processor to:
alter a user interface for a predetermined game in response to determining the location of the at least one wireless gaming terminal.

7. The apparatus of claim 1, in which the instructions, when executed by the at least one processor, further direct the at least one processor to:
alter at least one rule of a second game in response to determining a current location of the at least one wireless gaming terminal while the first user is playing the second game.

8. The apparatus of claim 1, in which the instructions, when executed by the at least one processor, further direct the at least one processor to:
receive the determined location as an input parameter of the game, and
alter a wager of the game in response to determining the location of the at least one wireless gaming terminal.

9. The apparatus of claim 1, in which the instructions, when executed by the at least one processor, further direct the at least one processor to:
receive the determined location as an input parameter of the game, and
alter by the at least one processor a bet option of the game in response to determining the location of the at least one wireless gaming terminal.

10. The apparatus of claim 1, in which the instructions, when executed by the at least one processor, further direct the at least one processor to:
receive the determined location as an input parameter of a second game, and
alter an ancillary incentive for playing the second game in response to determining a current location of the at least one wireless gaming terminal while the first user is playing the second game.

11. The apparatus of claim 1, in which the instructions, when executed by the at least one processor, further direct the at least one processor to:
communicate an incentive to at least one wireless gaming terminal of at least one user, in which the act of communicating comprises providing an incentive for the first user to be present at a defined location.

12. The apparatus of claim 1, wherein the apparatus offers an incentive for a player to relocate to a different location.

13. The apparatus of claim 1, wherein the apparatus offers an incentive for a player to remain in a location.

14. The apparatus of claim 1, in which the instructions, when executed by the at least one processor, further direct the at least one processor to:
output information based on the determined outcome.

15. The apparatus of claim 1, in which the selectable betting parameter comprises a user-selectable outcome of a betting event.

16. The apparatus of claim 1, in which the instructions, when executed by the at least one processor, further direct the at least one processor to:
after determining the location of the at least one user, determine an event in the game,
in which the act of determining an outcome of the bet comprises determining by the at least one processor a result of the game based at least in part on the event, and the determined selectable betting parameter.

17. The apparatus of claim 16, in which the event comprises a gameplay event that occurs in a game of chance, the event occurring independently of any selectable gameplay input parameter.

18. The apparatus of claim 1, in which the determined outcome of the bet comprises an outcome of the game.

19. The apparatus of claim 1, in which the act of determining an outcome of the bet comprises determining a winner of the game.

20. The apparatus of claim 1, in which the bet in the game comprises a wager amount selected by the first user and a user-selected possible outcome of the bet.

21. The apparatus of claim 1, in which each selectable betting parameter comprises gameplay criteria.

22. The apparatus of claim 1, in which each selectable betting parameter comprises win criteria.

23. The apparatus of claim 1, in which the selectable betting parameter comprises a bet.

24. The apparatus of claim 1, in which the instructions, when executed by the at least one processor, further direct the at least one processor to:
 receive from the first user a selection of a wager amount of the bet of the first user,
 in which the betting parameter determined for the first user comprises a selection of a betting outcome associated with the wager amount.

25. The apparatus of claim 1, in which the at least one user further comprises the second user who is playing the game, and in which the instructions, when executed by the at least one processor, further direct the at least one processor to:
 determine that a first user is in the first location;
 determine that a second user is in the second location;
 determine an outcome of the game for the first user based on determining that the first user is in the first location;
 determine an outcome of the game for the second user based on determining that the second user is in the second location, in which the outcome of the game for the second user is different from the outcome of the game for the first user.

26. The apparatus of claim 1, in which the outcome of the game for the second user is different from the outcome of the game for the first user based on the first user and the second user being in different determined locations.

27. A method comprising:
 determining by at least one processor a plurality of selectable betting parameters for a wager in a game,
  each selectable betting parameter comprising a game parameter that affects an outcome of a bet by a first user in the game,
  the plurality of selectable betting parameters comprising at least a first selectable betting parameter and a second selectable betting parameter,
  the game being played by at least one user using a corresponding at least one wireless gaming terminal associated with each of the at least one user, each of the at least one wireless gaming terminal having a wireless network interface operable to transmit and receive gaming information, the at least one user comprising the first user,
  in which each wireless gaming terminal is in communication with a location determination system that determines a location of the wireless gaming terminal, each wireless gaming terminal further having a user interface for interacting with a corresponding user of the wireless gaming terminal to implement a game, wherein the game depends on the determined location;
 determining by the at least one processor a plurality of different locations in a gaming area, each location corresponding to at least one of the plurality of selectable betting parameters,
  the plurality of locations comprising at least a first location corresponding to the first betting parameter and a second location corresponding to the second betting parameter,
  in which the first location is different from the second location,
  in which the first selectable betting parameter is different from the second selectable betting parameter such that a selection of the first selectable betting parameter would cause a different result for the bet than a selection of the second selectable betting parameter;
 during the game, determining by the at least one processor a location of at least one wireless gaming terminal corresponding to each of the at least one user in the game, in which the act of determining the location of the at least one wireless gaming terminal comprises determining a location of a first wireless gaming terminal of a first user;
 determining by the at least one processor at least one of the plurality of selectable betting parameters associated with the at least one user in the game based on the determined location of the at least one user, in which the act of determining at least one of the plurality of selectable betting parameters comprises determining at least one of the plurality of selectable betting parameters associated with the first user based on the determined location of the first user;
 determining by the at least one processor the outcome of the bet based at least in part on the determined betting parameter in accordance with one or more predetermined rules of the game; and
 outputting by the at least one processor information based on the determined result.

28. The apparatus of claim 1, in which each of the plurality of different locations corresponds to a different one of the plurality of selectable betting parameters, and each of the plurality of selectable betting parameters corresponds to a different one of the plurality of different locations.

29. The apparatus of claim 28,
 in which the determined location of the at least one user comprises a specific one of the plurality of different locations in the gaming area corresponding to a specific one of the plurality of selectable betting parameters, and
 in which the act of determining at least one of the plurality of selectable betting parameters associated with the at least one user comprises determining the specific selectable betting parameter associated with the at least one user based on the location of the at least one user comprising the specific location corresponding to the specific selectable betting parameter.

30. The apparatus of claim 29, in which the first selectable betting parameter is different from the second selectable betting parameter such that a selection of the first selectable betting parameter by the first user would cause the first user to win the bet and a selection of the second selectable betting parameter by the first user would cause the first user to lose the bet.

* * * * *